(12) United States Patent
Kim et al.

(10) Patent No.: US 9,551,498 B2
(45) Date of Patent: Jan. 24, 2017

(54) INDOOR UNIT OF AIR CONDITIONER AND METHOD OF CONTROLLING THE AIR CONDITIONER

(71) Applicant: SAMSUNG ELECTRONICS CO., LTD., Suwon-si (KR)

(72) Inventors: Jung Ho Kim, Suwon-si (KR); Jin Baek Kim, Suwon-si (KR); Yeon Seob Yun, Suwon-si (KR); Tae Duk Kim, Yongin-si (KR); Woo Seog Song, Yongin-si (KR); Moon Sun Shin, Suwon-si (KR); Hae Gyun Shin, Osan-si (KR); Ki Pyo Ahn, Suwon-si (KR); Joon Ho Yoon, Suwon-si (KR); Min Gi Cho, Suwon-si (KR); Jae Youn Cho, Suwon-si (KR); Sun Muk Choi, Suwon-si (KR); Hyoung Seo Choi, Hwaseong-si (KR); Dong Gi Han, Seoul (KR); Jin Woo Hong, Suwon-si (KR); Jun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/928,910

(22) Filed: Jun. 27, 2013

(65) Prior Publication Data
US 2014/0000852 A1 Jan. 2, 2014

(30) Foreign Application Priority Data

Jun. 28, 2012 (KR) .................. 10-2012-0070377
Dec. 18, 2012 (KR) .................. 10-2012-0148804
Apr. 3, 2013 (KR) .................. 10-2013-0036564

(51) Int. Cl.
*F28F 27/00* (2006.01)
*F24F 7/007* (2006.01)
(Continued)

(52) U.S. Cl.
CPC ............ *F24F 7/007* (2013.01); *F24F 1/0022* (2013.01); *F24F 11/0079* (2013.01); *Y02B 30/746* (2013.01)

(58) Field of Classification Search
CPC ...... F24F 7/007; F24F 11/0079; F24F 1/0018; F24F 1/0029; F24F 1/38; F24F 1/56; F24F 1/0022; F24F 13/02; F24F 13/0209; F24F 13/0236; F24F 13/06; F24F 13/062; F24F 13/065; F24F 13/082; F24F 13/084; F24F 13/20; F24F 2221/28; Y02B 30/746
(Continued)

(56) References Cited

U.S. PATENT DOCUMENTS 6,200,094 B1 * 3/2001 Skoch et al. ............... 415/208.2
2003/0182954 A1 * 10/2003 Parker .................. F04D 29/325
62/186

(Continued)

FOREIGN PATENT DOCUMENTS

CN 2384157 6/2000
CN 2784792 Y 5/2006
(Continued)

OTHER PUBLICATIONS

DE_102010016377_B3_I machine translation.*
(Continued)

*Primary Examiner* — Len Tran
*Assistant Examiner* — Gordon Jones
(74) *Attorney, Agent, or Firm* — Staas & Halsey LLP

(57) ABSTRACT

An indoor unit of an air conditioner having improved structures of suction, discharge and/or flow passages which may increase operation efficiency, reduce noises and realize a compact size. The indoor unit includes a housing comprising a front panel and a rear panel coupled to a rear (Continued)

portion of the front panel, at least one discharge outlet exposed to a front of the front panel, at least one suction inlet formed in the rear panel at a position corresponding to the discharge outlet, at least one heat exchanger disposed at a front portion of the suction inlet to absorb heat from air introduced through the suction inlet or transfer heat to the air introduced through the suction inlet, and at least one diagonal flow fan disposed between the heat exchanger and the discharge outlet to suction air passing through the heat exchanger and discharge the air through the discharge outlet.

13 Claims, 24 Drawing Sheets

(51) Int. Cl.
*F24F 1/00* (2011.01)
*F24F 11/00* (2006.01)

(58) Field of Classification Search
USPC ........ 165/DIG. 311, DIG. 312, 99, 122, 126, 165/313, 314; 62/426, 427, 263; 415/176, 415/178, 186, 191, 199.6, 207, 208.2, 415/211.1, 211.2, 218.2, 223
See application file for complete search history.

(56) References Cited

U.S. PATENT DOCUMENTS

| | | | |
|---|---|---|---|
| 2003/0209024 A1* | 11/2003 | Lee | 62/262 |
| 2004/0165986 A1* | 8/2004 | Parker | F04D 29/164 415/220 |
| 2005/0092015 A1* | 5/2005 | Park et al. | 62/419 |
| 2005/0132737 A1* | 6/2005 | Jeon | 62/298 |
| 2006/0045774 A1* | 3/2006 | Lu et al. | 417/423.7 |
| 2007/0023420 A1* | 2/2007 | Gagas | 219/623 |
| 2007/0129001 A1* | 6/2007 | Orr | 454/239 |
| 2007/0137243 A1* | 6/2007 | Lee et al. | 62/419 |
| 2009/0110542 A1* | 4/2009 | Kim et al. | 415/121.2 |
| 2009/0269196 A1* | 10/2009 | Hsu et al. | 415/211.2 |
| 2009/0317239 A1* | 12/2009 | Xu | 415/121.2 |
| 2011/0126581 A1* | 6/2011 | Cho et al. | 62/507 |
| 2012/0190293 A1* | 7/2012 | Badenhorst | 454/284 |

FOREIGN PATENT DOCUMENTS

| | | | | |
|---|---|---|---|---|
| CN | 1989376 | | 6/2007 | |
| CN | 101512237 | | 8/2009 | |
| CN | 102345638 A | | 2/2012 | |
| DE | 102010016377 B3 * | | 9/2011 | B60H 1/3421 |
| EP | 2 416 074 | | 2/2012 | |
| KR | 10-2010-0119140 | | 11/2010 | |
| TW | 200944660 A | | 11/2009 | |
| WO | WO 2004088210 A1 * | | 10/2004 | F04D 19/002 |
| WO | 2011/022788 A1 | | 3/2011 | |

OTHER PUBLICATIONS

Chinese Office Action issued Dec. 31, 2015 in corresponding Chinese Patent Application 201310269631.9.
Chinese Office Action issued Jun. 3, 2015 in corresponding Chinese Patent Application No. 201310269631.9.

* cited by examiner

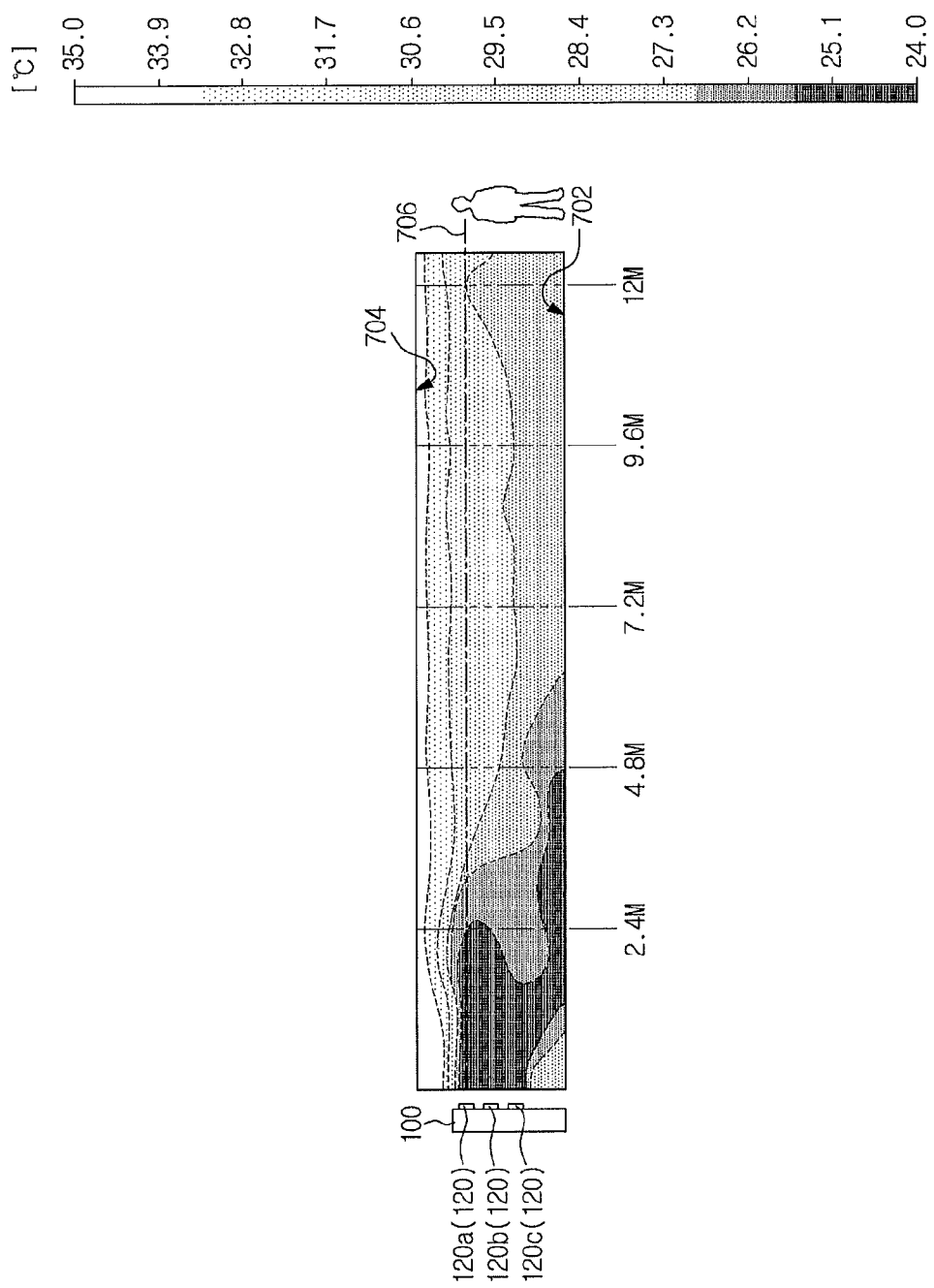

INDOOR UNIT OF AIR CONDITIONER AND METHOD OF CONTROLLING THE AIR CONDITIONER

CROSS-REFERENCE TO RELATED APPLICATIONS

This application claims the priority benefit of Korean Patent Application Nos. 10-2012-0070377, filed on Jun. 28, 2012, 10-2012-0148804, filed on Dec. 18, 2012, and 10-2013-0036564, filed on Apr. 3, 2013, in the Korean Intellectual Property Office, the disclosures of which are incorporated herein by reference.

BACKGROUND

1. Field

The following description relates to an indoor unit of an air conditioner having improved structures of suction, discharge and/or flow passages.

2. Description of the Related Art

An air conditioner, which generally uses a refrigeration cycle to adjust temperature, humidity, flow and distribution of ambient air to levels proper for human activities and remove dust from the air, includes a compressor, a condenser, an evaporator and a blower fan.

Air conditioners may be divided into a split type air conditioner, which has an indoor unit and an outdoor unit separately installed, and an integrated type air conditioner, which has an indoor unit and an outdoor unit installed together in a cabinet.

The indoor unit of the split type air conditioner is provided with a heat exchanger to exchange heat with air suctioned into a panel, and a blower fan to suction the indoor air into the panel and blow the same to the room.

For the split type air conditioner, a blower fan is generally disposed at the lower portion of the indoor unit, and a heat exchanger and an air discharge outlet allowing air to be discharged therethrough are disposed at the upper portion of the indoor unit. The air suctioned and blown by the blower fan moves to the upper portion of the indoor unit, passes the heat exchanger and the air discharge outlet, and is then discharged to the room.

However, for the indoor unit having such structure as above, the vertical arrangement of the blower fan and the heat exchanger may not be efficient in view of space utilization.

Moreover, since the air from the blower fan is moved to the upper portion of the indoor unit and then discharged, the flow passage leading from the lower portion of the indoor unit to the upper portion thereof is long, and the load applied to the blower fan to blow the suctioned air is large. Thereby inefficient utilization of energy may be caused, and increase in the volume and speed of air flow may be limited.

In addition, if the heat exchanger and the blower fan are disposed too close to each other to realize a compact and slim design of the indoor unit, air resistance in heat exchange may increase, resulting in degradation of performance of the blower fan and increase in noise level during operation.

SUMMARY

Therefore, it is an aspect of the present disclosure to provide an indoor unit of an air conditioner provided with improved structures of suction, discharge and/or air flow passages to increase operational efficiency, lower noise level, and realize a compact size.

It is another aspect of the present disclosure to provide an indoor unit of an air conditioner which allows convenient adjustment of the flow direction and volume of air discharged from the indoor unit.

Additional aspects of the disclosure will be set forth in part in the description which follows and, in part, will be apparent from the description, or may be learned by practice of the disclosure.

In accordance with one aspect of the present disclosure, an indoor unit of an air conditioner includes a housing, at least one discharge outlet, at least one suction inlet, at least one heat exchanger, and at least one diagonal flow fan. The housing may include a front panel provided with at least one opening and a rear panel coupled to a rear portion of the front panel. The at least one discharge outlet may be exposed to a front of the front panel through the opening. The at least one suction inlet may be formed in the rear panel at a position corresponding to the discharge outlet. The at least one heat exchanger may be disposed at a front portion of the suction inlet to absorb heat from air introduced through the suction inlet or transfer heat to the air introduced through the suction inlet. The at least one diagonal flow fan may be disposed between the heat exchanger and the discharge outlet to suction air passing through the heat exchanger and discharge the air through the discharge outlet.

The discharge outlet, the diagonal flow fan, the heat exchanger and the suction inlet may be disposed in a horizontal direction from a front portion of the housing to a rear portion of the housing.

The at least one discharge outlet may include two or more discharge outlets disposed spaced apart from each other in a vertical direction of the indoor unit.

An angle formed between a direction in which air is suctioned into the diagonal flow fan and a direction in which the air is discharged through the discharge outlet may be about 15° or above and about 60° or below.

The indoor unit may further include a diffuser disposed at a front portion of the diagonal flow fan, wherein the diffuser may include a circular disc plate, and a grille coupled to an outer circumferential surface of the circular disc plate to form the discharge outlet between the grille and the circular disc plate.

The indoor unit may further include a drive motor coupled to a rear surface of the circular disc plate, a rotating shaft of the drive motor arranged facing the suction inlet, wherein the diagonal flow fan may include a hub coupled to the rotating shaft of the drive motor; and a plurality of blades coupled to an outer circumferential surface of the hub.

The diagonal flow fan may be formed to slantingly discharge the suctioned air with respect to a central axis of the hub.

The hub may be provided with an inclined portion, and an angle formed between the inclined portion and the central axis of the hub may be about 10° or above and about 40° or below.

A diameter of the hub may decrease as the hub extends toward the suction inlet.

The outer circumferential surface of the hub may be formed to be inclined, wherein an angle formed between the outer circumferential surface of the hub and an imaginary line passing through a center of the rotating shaft of the drive motor may be about 10° or above and about 40° or below.

A shortest distance between an end portion of the blade of the diagonal flow fan and a front surface of the heat exchanger may be about 20 mm or above and about 50 mm or below.

The indoor unit may further include a duct coupled to a rear surface of the grille to form a flow passage allowing the air suctioned by the diagonal flow fan to be discharged to the discharge outlet therethrough.

The at least one diagonal flow fan may be independently controllable.

In accordance with another aspect of the present disclosure, an indoor unit of an air conditioner includes a housing, at least one suction inlet, at least one heat exchanger, and at least one diagonal flow fan unit. The housing may include a front panel provided with at least one opening and a rear panel coupled to a rear portion of the front panel. The at least one suction inlet may be formed in the rear panel. The at least one heat exchanger may be disposed at a front portion of the suction inlet. The at least one diagonal flow fan unit may be disposed at a front portion of the heat exchanger and provided with a discharge outlet exposed to a front of the front panel through the opening. The diagonal flow fan unit may include a diffuser, a driver motor, a diagonal flow fan and a duct. The diffuser may form the discharge outlet. The drive motor may be coupled to a rear surface of the diffuser. The diagonal flow fan may be rotatably coupled to the drive motor. The duct may be coupled to the rear surface of the diffuser to form a flow passage allowing the air suctioned by the diagonal flow fan to be discharged to the discharge outlet therethrough.

The opening, the diagonal flow fan unit, the heat exchanger and the suction inlet may be disposed in a horizontal direction from a front portion of the housing to a rear portion of the housing.

The at least one diagonal flow fan unit may include a plurality of diagonal flow fan units disposed spaced apart from each other in a vertical direction of the indoor unit.

A lateral surface of the duct surrounding the diagonal flow fan may be formed to be inclined, wherein an angle formed between the lateral surface of the duct and an imaginary line passing through a center of rotation of the diagonal flow fan may be about 5° or above and about 15° or below.

The diffuser may include a circular disc plate, and a grille coupled to an outer circumferential surface of the circular disc plate to form the discharge outlet between the grille and the circular disc plate.

The indoor unit may further include a fixing frame to fix the diagonal flow fan unit and the heat exchanger in the housing.

The diagonal flow fan may include a hub and a plurality of blades. The hub may be coupled to a rotating shaft of the drive motor and having an outer circumferential surface thereof formed to be inclined. The plurality of blades may be coupled to the outer circumferential surface of the hub.

The diagonal flow fan may be formed to slantingly discharge the suctioned air with respect to a central axis of the hub.

The hub may be provided with an inclined portion, and an angle formed between the inclined portion and the central axis of the hub may be about 10° or above and about 40° or below.

The discharge outlet may be formed in a ring shape.

The indoor unit may further include a controller to generate a control command to independently control the at least one diagonal flow fan unit in response to a selected operation mode.

The indoor unit may further include a fan drive unit to control the motor in response to the control command of the controller.

The independent control of the at least one diagonal flow fan unit may include independently turning on/off the at least one diagonal flow fan unit.

The independent control of the at least one diagonal flow fan unit may include independently controlling a speed of rotation of the at least one diagonal flow fan unit.

The independent control of the at least one diagonal flow fan unit may include turning off some of the at least one diagonal flow fan unit and independently controlling a speed of rotation of the remaining of the at least one diagonal flow fan unit.

In accordance with another aspect of the present disclosure, a method of controlling an air conditioner having an indoor unit provided with a plurality of diagonal flow fan units includes receiving selection of an operation mode, generating a control command to implement the selected operation mode, and independently controlling the at least one diagonal flow fan unit in response to the control command.

The independently controlling may include independently turning on/off the at least one diagonal flow fan unit.

The independently controlling may include independently controlling a speed of rotation of the at least one diagonal flow fan unit.

The independently controlling may include turning off some of the diagonal flow fan units and independently controlling a speed of rotation of the remaining of the at least one diagonal flow fan unit.

The discharge outlet may be formed in a circular shape to radially discharge air.

The discharge outlet may be configured to be opened and closed.

The suction inlet may be positioned on at least one of an upper portion, lower portion, left portion and right portion of the rear panel.

A radius of the circular disc plate may be within a range between 0.8 R and 1.2 R, where R may represent a distance between a point at which an extension line of an outer portion of the hub meets an extension line of an outer portion of the circular disc plate and a center point of the circular disc plate.

A shortest distance between at least one of the at least one heat exchanger and at least one of the at least one suction inlet may be about 40 mm or above and about 60 mm or below.

A shortest distance between an end portion of the blade of the diagonal flow fan and the heat exchanger may be about 20 mm or above and about 50 mm or below.

The indoor unit may further include a guide vane provided at the discharge outlet.

The guide vane may include a first vane formed in a ring shape in a circumferential direction of the discharge outlet, and a second vane radially formed at the discharge outlet.

A cross section of the first vane may be provided in a streamline shape.

A radial inner lateral surface of the first vane may be formed such that a rear end portion thereof is inclined at a predetermined inclination angle with respect to an axial direction of the diagonal flow fan, and as the radial inner lateral surface extends toward a front, the inclination angle may decrease and a front end portion of the radial inner lateral surface may be formed parallel to the axial direction of the diagonal flow fan.

A radial outer lateral surface of the first vane may be formed to be convex toward an outside in a radial direction.

The indoor unit may further include at least one blade plate extending from the circular disc plate to the grille in a first direction and guiding air blowing from the diagonal flow fan, wherein the blade plate may be curved, along the first direction, in a direction opposite to a direction of rotation of the diagonal flow fan.

The blade plate may be formed by a spiral rib.

The blade plate may include a front portion facing in a front direction, and a rear portion facing in a rear direction, wherein the front portion and the rear portion may be curved with different radii of curvature.

The rear portion may be curved more than the front portion

In accordance with another aspect of the present disclosure, an indoor unit of an air conditioner includes a housing, a circular disc plate, a ring-shaped discharge outlet, a first guide unit and a second guide unit. The housing may be provided with at least one circular opening at a front surface thereof. The circular disc plate may be disposed to cover a central portion of the circular opening. The ring-shaped discharge outlet may be formed between an inner circumferential surface of the circular opening and an outer circumferential surface of the circular disc plate. The first guide unit may be arranged at a rear portion of the circular disc plate and configured to guide introduced air to the ring-shaped discharge outlet such that the air is discharged forward through the ring-shaped discharge outlet. The second guide unit may be arranged at a rear portion of the circular opening to guide the introduced air to the ring-shaped discharge outlet. The first guide unit may be provided with a shape of a cylinder having one portion thereof closed, a diameter of the cylinder decreasing as the cylinder extends inward from the circular disc plate. The second guide unit may be provided with a shape of a circular duct. The introduced air may be discharged forward through a flow passage defined between the first guide unit and the second guide unit to diverge in a plurality of directions of the ring-shaped discharge outlet.

The cylinder of the first guide unit may decrease more sharply than the diameter of the circular duct of the second guide unit.

A diameter of the circular disc plate may decrease as the circular disc plate extends from a front surface thereof to a rear surface thereof.

An outer circumferential surface of the cylinder of the first guide unit may form a first inclination angle with respect to an imaginary line passing through a center of the circular disc plate and a center of the first guide unit, wherein the first inclination angle may be about 10° or above and about 40° or below.

An inner circumferential surface of the circular duct of the second guide unit may form a second inclination angle with respect to an imaginary line passing through a center of the circular disc plate and a center of the first guide unit, wherein the second inclination angle may be about 5° or above and about 15° or below.

An extended line of the outer circumferential surface of the cylinder of the first guide unit may meet an edge portion of the circular disc plate.

The flow passage may be disposed to be inclined with respect to an imaginary line passing through a center of the circular disc plate and a center of the first guide unit.

A width of the flow passage may decrease as the flow passage extends toward the ring-shaped discharge outlet.

The indoor unit may further include a drive motor coupled to a rear surface of the circular disc plate, and a fan disposed at a rear portion of the drive motor and rotatably coupled to the drive motor. Air may be slantingly discharged toward the ring-shaped discharge outlet by rotation of the fan.

The first guide unit may be rotatably coupled to a rotating shaft of the drive motor. The fan may include a plurality of blades coupled to the first guide unit and the outer circumferential surface of the first guide unit.

The indoor unit may further include at least one suction inlet formed at a rear surface of the housing, and a heat exchanger disposed between the fan and the suction inlet.

In accordance with another aspect of the present disclosure, an indoor unit of an air conditioner includes a housing, a circular disc plate, a first guide unit, a second guide unit, and a flow passage. The housing may be provided with at least one circular opening at a front portion thereof. The circular disc plate may be disposed at a central portion of the circular opening to form a ring-shaped discharge outlet. The first guide unit may be disposed at a rear portion of the circular disc plate and formed in a shape of a cylinder having one portion thereof closed, a diameter of the cylinder being smaller than a diameter of the circular disc plate. The second guide unit may be configured to surround a periphery of the first guide unit and formed in a shape of a circular duct having opposite portions thereof open, a diameter of the circular duct being larger than a diameter of the circular disc plate. The flow passage may be formed between the first guide unit and the second guide unit and communicate with the discharge outlet. An outer diameter and an inner diameter of the flow passage may increase as the flow passage extend toward the discharge outlet such that air discharged from the discharge outlet through the flow passage may diverge in a plurality of directions of the discharge outlet.

The inner diameter of the flow passage may increase more sharply than the outer diameter of the flow passage.

A width of the flow passage may decrease as the flow passage extends toward the discharge outlet.

The indoor unit may further include a drive motor coupled to a rear surface of the circular disc plate, and a fan disposed at a rear portion of the drive motor and rotatably coupled to the drive motor. Air may be slantingly discharged toward the ring-shaped discharge outlet by rotation of the fan.

The indoor unit may further include a heat exchanger and at least one suction inlet. The heat exchanger may be disposed at a rear portion of the fan. The at least one suction inlet may be formed at a rear surface of the housing and may be disposed at a rear portion of the heat exchanger.

The first guide unit may be rotatably coupled to a rotating shaft of the drive motor.

The fan may include a plurality of blades coupled to the first guide unit and an outer circumferential surface of the first guide unit.

In accordance with another aspect of the present disclosure, an air discharge guide structure for an indoor unit of an air conditioner including a housing, the air discharge guide structure includes a circular opening, a circular disc plate, a ring-shaped discharge outlet, a first guide unit, and a second guide unit. The circular opening may be formed at a front surface of the housing. The circular disc plate may be disposed to cover a central portion of the circular opening. The ring-shaped discharge outlet may be formed between the circular opening and the circular disc plate. The first guide unit may be disposed at a rear portion of the circular disc plate. The second guide unit may be configured to surround a periphery of the first guide unit and may be arranged at a rear portion of the circular opening. The first guide unit may be provided with a shape of a cylinder having a diameter decreasing as the cylinder extends inward from the circular disc plate. The second guide unit may be provided with a shape of a duct having a diameter decreasing as the duct extends inward from the circular disc plate. The diameter of the duct decreases more steadily than the diameter of the cylinder.

A distance between the shape of the cylinder of the first guide unit and the shape of the duct of the second guide unit may increase as the first guide unit and the second guide unit extend inward from the circular disc plate.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 7A-7D is a view illustrating the temperature distribution of the air discharged from the discharge outlet in respective operation modes of the indoor unit of the air conditioner according to the illustrated embodiment of the present disclosure;

DETAILED DESCRIPTION

Figure 1:
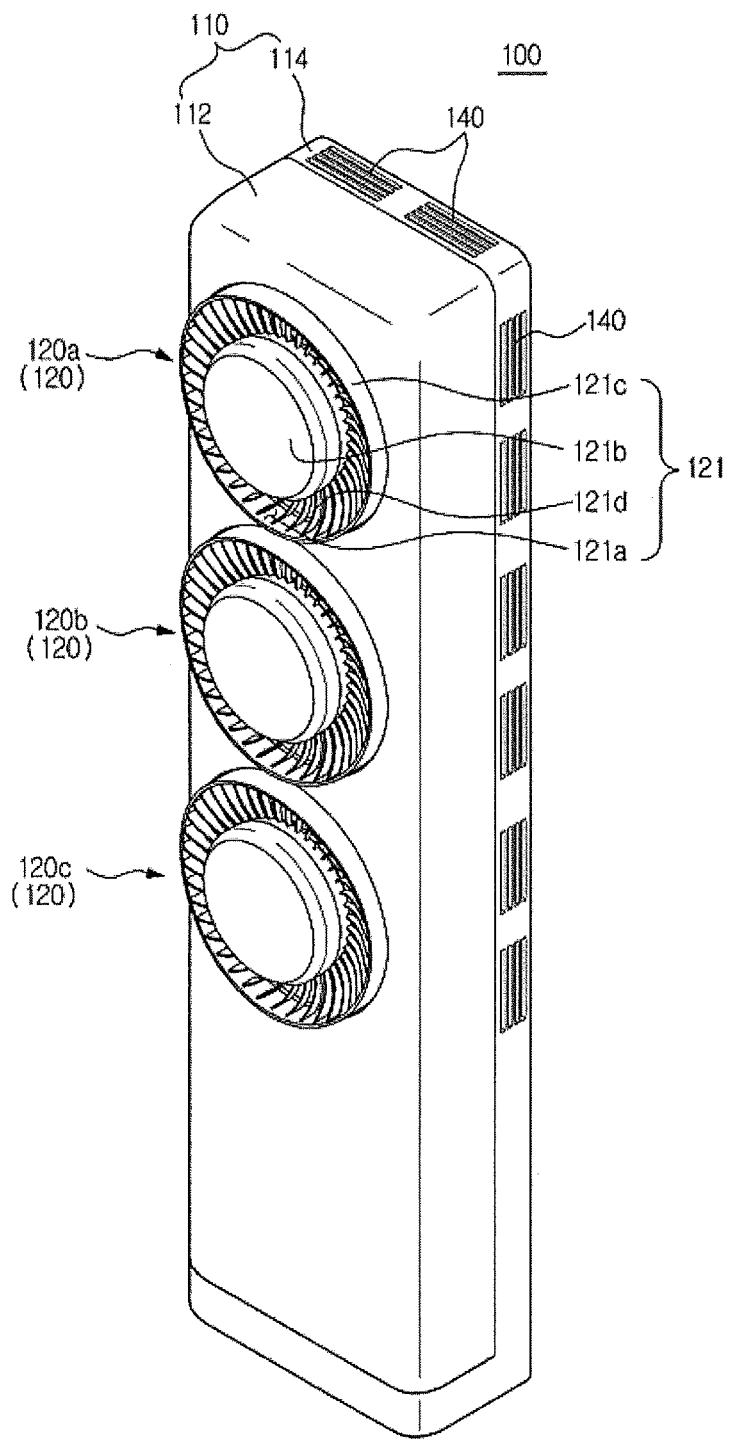
FIG. 1 is a view illustrating an indoor unit of an air conditioner according to an exemplary embodiment of the present disclosure.

Reference will now be made in detail to embodiments of the present disclosure, examples of which are illustrated in the accompanying drawings, wherein like reference numerals refer to like components throughout.

Figure 2:
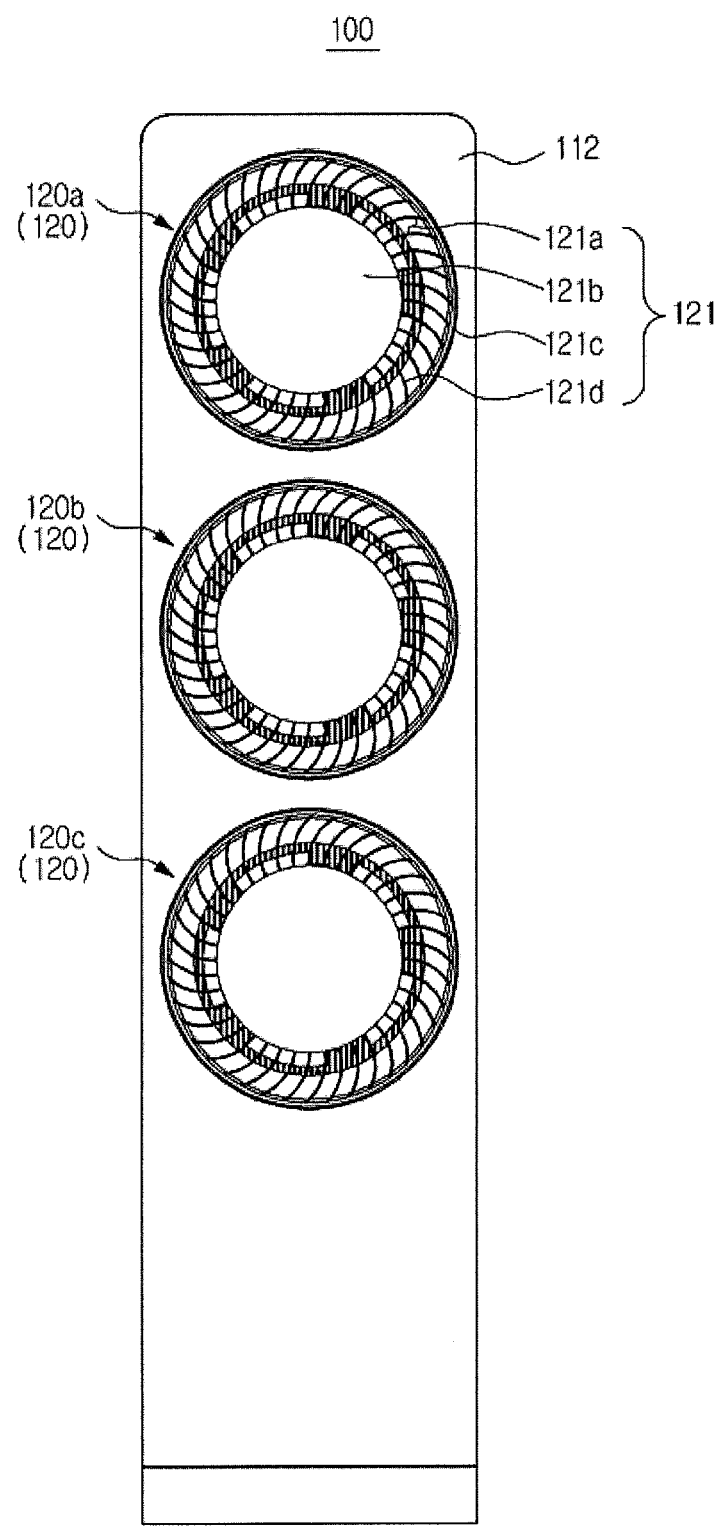
FIG. 2 is a view illustrating the front portion of the indoor unit shown in FIG. 1.
Figure 3:
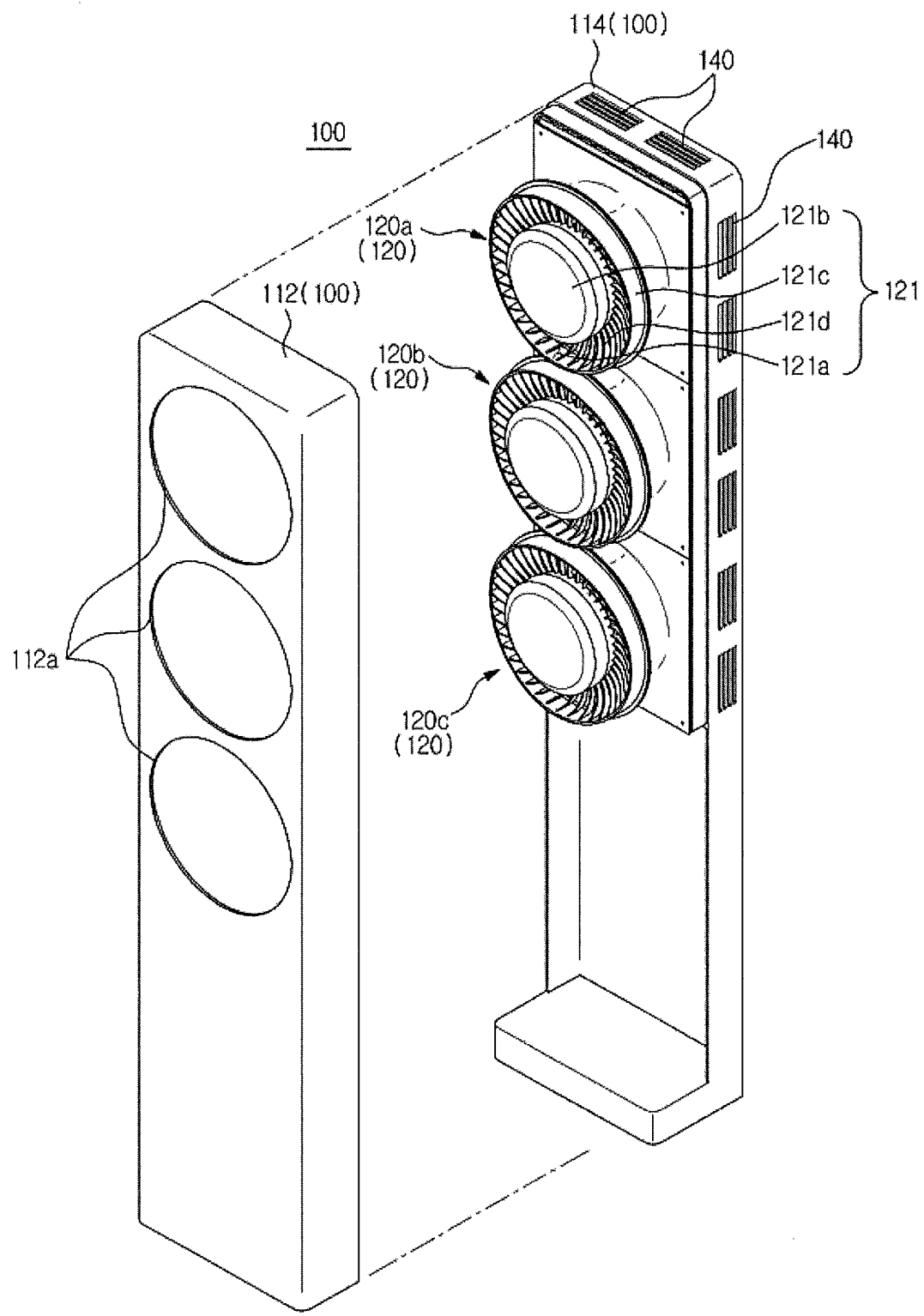
FIG. 3 is a view illustrating the indoor unit shown in FIG. 1, in which the front panel is separated from the indoor unit.
Figure 4:
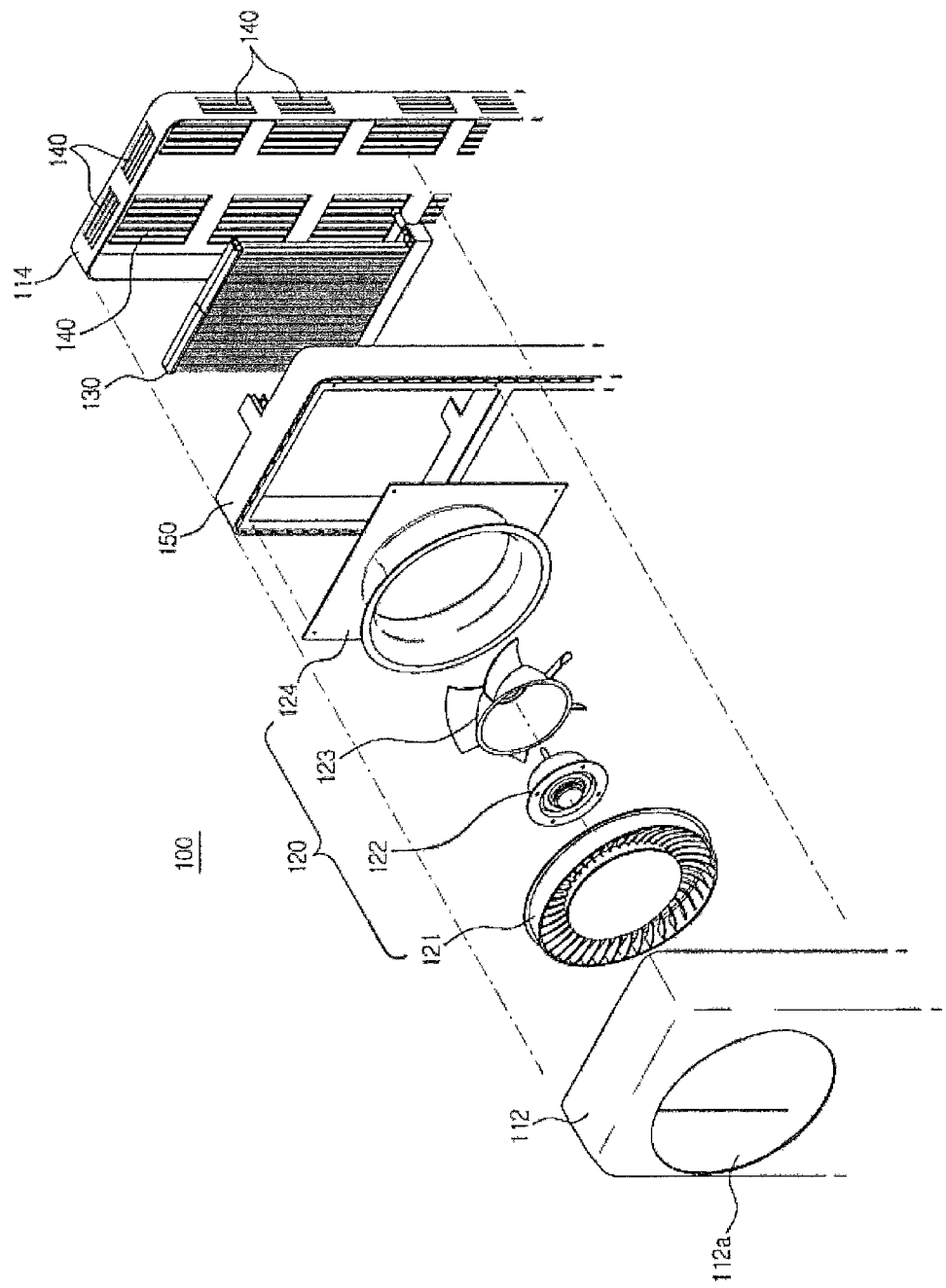
FIG. 4 is an exploded perspective view illustrating part of the indoor unit shown in FIG. 1.
Figure 5:
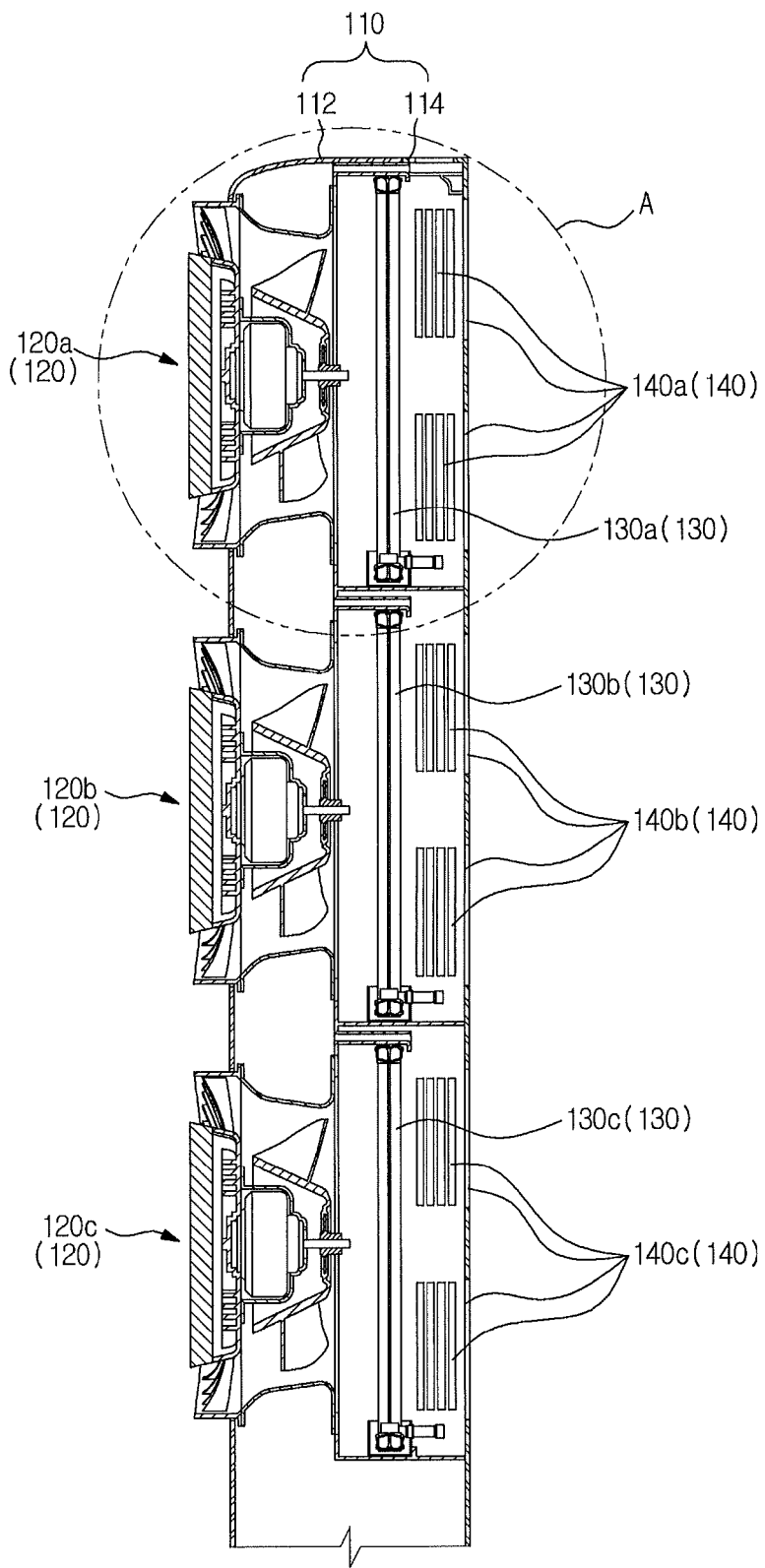
FIG. 5 is a cross-sectional view illustrating the indoor unit shown in FIG. 1.
Figure 6:
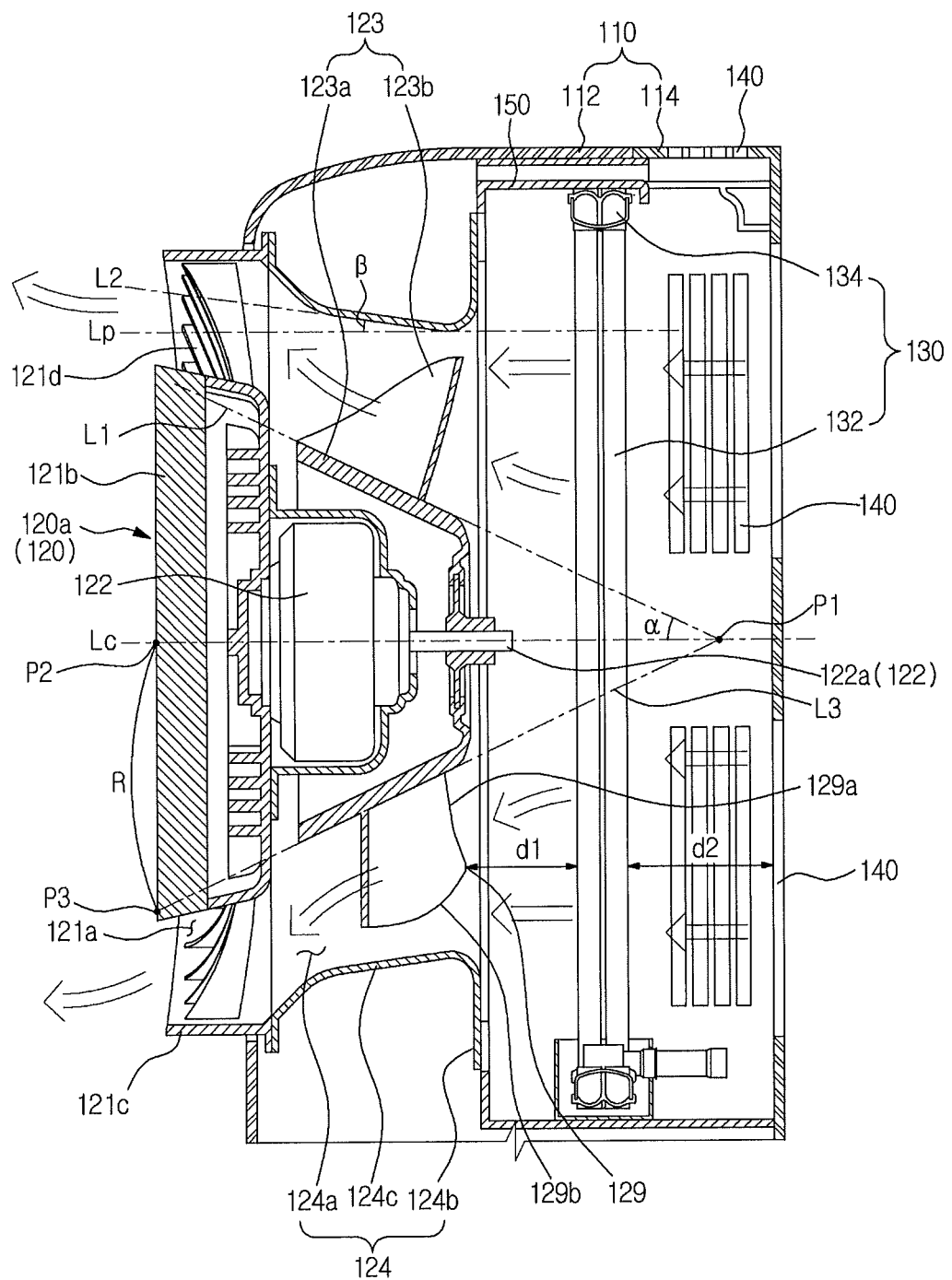
FIG. 6 is an enlarged view showing section 'A' of FIG. 5.

FIG. 1 is a view illustrating an indoor unit of an air conditioner according to an exemplary embodiment of the present disclosure, FIG. 2 is a view illustrating the front portion of the indoor unit shown in FIG. 1, and FIG. 3 is a view illustrating the indoor unit shown in FIG. 1, in which the front panel is separated from the indoor unit. FIG. 4 is an exploded perspective view illustrating part of the indoor unit shown in FIG. 1, FIG. 5 is a cross-sectional view illustrating the indoor unit shown in FIG. 1, and FIG. 6 is an enlarged view showing section 'A' of FIG. 5.

As shown in FIGS. 1 to 6, the indoor unit of air conditioner 100 includes a housing 110 forming an external appearance of the indoor unit 100, a plurality of diagonal flow fan units 120 disposed in the housing 110, at least one heat exchanger 130 disposed at the rear portion of the diagonal flow fan units 120 in the housing 110, a plurality of suction inlets 140 provided on the rear portion of the housing 110.

The housing 110 includes a front panel 112 provided with a plurality of openings 112a allowing the discharge outlet 121a of the diagonal flow fan unit 120 to be exposed at the front portion thereof, a rear panel 114 coupled to the rear portion of the front panel 112. The openings 112a may be formed in, for example, a circular shape, and at least two thereof may be disposed spaced apart from each other in a vertical direction of the front panel 112. Although in FIG. 1, the air conditioner with vertically arranged diagonal flow fan units are shown, the present disclosure is not limited thereto. The air conditioner may have horizontally arranged diagonal flow fan units or both horizontally and vertically arranged diagonal flow fan units.

At least one diagonal flow fan unit 120 includes a diffuser 121 forming a discharge outlet 121a, a drive motor 122 coupled to the rear surface of the diffuser 121, a diagonal flow fan 123 rotatably coupled to the drive motor 122, and a duct 124 coupled to the rear surface of the diffuser 121 to form a flow passage forming duct 124a allowing the air suctioned by the diagonal flow fan 123 to move therethrough to be discharged to the discharge outlet 121a.

The diffuser 121 includes a circular disc plate 121b, a circular grille 121c coupled to the outer circumferential surface of the circular disc plate 121b, and a discharge outlet 121a formed between the circular disc plate 121b and the grille 121c. The discharge outlet 121a may have a ring-shaped, for example. The diffuser 121 is disposed at the front portion of the diagonal flow fan 123 to allow the air from the diagonal flow fan 123 to be discharged through the discharge outlet 121a to diverge in all directions toward the front of the front panel 112.

Referring to FIGS. 1 to 6, the circular disc plate 121b is disposed at the center of the circular grille 121c. However, the position of the circular disc plate 121b is not limited to the center of the circular grille 121c. The diameter of the circular disc plate 121b, which is related to noise generated when air is discharged from the indoor unit 100 of an air conditioner, may be between about 225 mm and about 265 mm. In addition, although not shown in FIGS. 1 to 6, the circular disc plate 121b and the grille 121c may be adapted to move in a direction in which the air is discharged from the indoor unit 100 or the direction opposite thereto.

The grille 121c includes blade plates 121d, and the flow direction and flow rate of the air discharged through the discharge outlet 121a may be adjusted by changing the number, shape and orientation of the blade plates 121d.

The flow direction and volume of air discharged through the discharge outlet 121a may also be adjusted by widening or narrowing the radial width of the discharge outlet 121a through adjustment of the distance between the circular disc plate 121b and the grille 121c, or by changing the diameter of the circular disc plate 121b.

The drive motor 122 is coupled to the rear surface of the circular disc plate 121b with the rotating shaft 122a thereof arranged facing the rear panel 114, and adapted to rotate the diagonal flow fan 123.

The diagonal flow fan 123, which functions as a fan to blow air introduced into the housing and is disposed between the diffuser 121 and the heat exchanger 130 to suction the air which has exchanged heat in the heat exchanger 130 and discharge the same to the discharge outlet 121a, includes a hub 123a coupled to the rotating shaft 122a of the drive motor 122, and a plurality of blades 123b coupled to the outer circumferential surface of the hub 123a.

The diameter of the hub 123a gradually decreases in a direction toward the suction inlet 140 and toward the rear panel 114, and thereby the outer circumferential surface of the hub 123a is formed inclined. To allow the air suctioned by the diagonal flow fan 123 to be slantingly discharged toward the discharge outlet 121a, an angle α formed between the lines L1 and L3 extending along the inclined outer circumferential surface of the hub 123a and an imaginary line Lc passing through the center of the rotating shaft 122a of the drive motor 122 may be between about 10° and about 40°.

When the point at which the lines L1 and L3 extending along the inclined outer circumferential surface of the hub 123a meet each other is defined as P1, the point at which a line extending from P1 meets the center of the circular disc plate 121b as P2, the point at which the lines L1 and L3 extending along the inclined outer circumferential surface of the hub 123a meet the circular disc plate 121b or a line extending from the circular disc plate 121b as P3, and the distance between P2 and P3 as R, the radius of the circular disc plate 121b may be within a range between about 0.8 R and about 1.2 R. According to the Coanda effect, the circular disc plate 121b causes the air to flow along the surface thereof. Thereby, the circular disc plate 121b functions to suppress creation of a vortex on the front surface of the discharge outlet 121a due to flow of the air. When the circular disc plate 121b is within a range between about 0.8 R and about 1.2 R, an aesthetically pleasing external appearance may be provided and creation of a vortex on the front surface of the discharge outlet 121a may be suppressed, and thereby the performance of the indoor unit 100 may be increased.

The plurality of blades 123b, for example, at least three of the plurality of blades 123b, are disposed equally spaced apart from each other along the outer circumferential surface of the hub 123a. When the blades 123b rotate together with the hub 123a, the blades 123b form a pressure gradient from the front portion of the diagonal flow fan 123 to the rear portion thereof to produce uniform flow of air.

The arc that connects the opposite lateral edges of the blade 123b is formed by two arcs having different radii of curvature. The boundary 129 between the first arc 129a and the second arc 129b may be positioned at a position close to the rear surface of the blade 123b beyond the center of the blade 123b. Thereby, the separation region in which the flow of air along the surface of the blade 123b is separated from the surface of the blade 123b may be narrowed compared to the case of having the boundary 129 between the first arc 129a and the second arc 129b positioned at the center or front surface of the blade 123b. Therefore, performance degradation of the indoor unit 100 due to separation may be prevented and, accordingly, noise level may be lowered.

When the shortest distance between one end portion of the blade 123b and the heat exchanger 130 disposed at the rear portion of the diagonal flow fan unit 120 is defined as d1, the shortest distance d1 may be between about 20 mm and about 50 mm. If the shortest distance d1 is less than 20 mm, the distance between the diagonal flow fan 123 and the heat exchanger 130 may be shortened, resulting in generation of suction resistance and increase of noise during operation. If the shortest distance d1 is greater than about 50 mm, the distance between the diagonal flow fan 123 and the heat exchanger 130 may be widened, and thereby the air having exchanged heat in the heat exchanger 130 may be not be smoothly suctioned into the diagonal flow fan 123.

In addition, when the shortest distance between the heat exchanger 130 and the suction inlet 140 is defined as d2, the shortest distance d2 may be between about 40 mm and about 60 mm.

The duct 124 includes a flow passage forming duct 124a formed in, for example, a circular shape to surround the diagonal flow fan 123 and define, in cooperation with the hub 123a, a flow passage for the air suctioned by the diagonal flow fan 123 to flow to the discharge outlet 121a and a fixing plate 124b connected to the rear portion of the flow passage forming duct 124a to fix the duct 124 within the housing 110.

The flow passage forming duct 124a has an inclined lateral surface to allow the air suctioned by the hub 123a and the diagonal flow fan 123 to be slantingly discharged toward the discharge outlet 121a. The angle formed between the line L2 extending along the lateral surface of the flow passage forming duct 124 and the line Lp parallel to the imaginary line passing the center of rotation of the diagonal flow fan 123 may be between about 5° and about 15°. The diffuser 121 is coupled and fixed to the front surface of the inlet of the flow passage forming duct 124a, and the duct 124 is coupled and fixed to a fixing frame 150 through a fixing plate 124b formed in a rectangular shape.

As describe above, the hub 123a and the duct 124 function to guide the introduced air such that the air is discharged to the front through the discharge outlet 121a. Accordingly, the hub 123a and the duct 124 may be viewed respectively as a first guide unit and a second guide unit.

The heat exchanger 130 is disposed between the diagonal flow fan unit 120 and the suction inlet 140 to absorb heat from the air introduced through the suction inlet 140 or transfer heat to the air introduced through the suction inlet 140. The heat exchanger 130 includes a tube 132, and a header 134 attached to the upper and lower portion of the tube 132.

One or more heat exchangers 130 may be disposed in the indoor unit 100. For example, a plurality of the heat exchangers 130 may be provided corresponding to the number of the diagonal flow fan units 120 and disposed respectively at the rear portions of the diagonal flow fan unit 120, or a single heat exchanger 130 corresponding to the entire size of all the diagonal flow fan units 120 may be disposed. In addition, heat exchange capacity may vary among the heat exchangers 130. That is, one of the heat exchangers 130 having a relatively low heat exchange capacity may be disposed at the rear portion of a corresponding one of the diagonal flow fan units 120, while another one of the heat exchangers 130 having a relatively large capacity of heat exchange may be disposed at the rear portion of two or more diagonal flow fan units 120.

The suction inlet 140 is provided on the rear panel 114 disposed at the rear portion of the heat exchanger 130 to guide flow of air from outside the indoor unit 100 into the indoor unit 100. The suction inlet 140 may be disposed on at least one of the top surface, lateral surfaces and rear surfaces of the rear panel 114.

As in the case of the heat exchangers 130, one or more suction inlets 140 may be provided on the rear panel 114, for example. To correspond to the respective diagonal flow fan units 120, the suction inlets 140 corresponding in number to the number of the diagonal flow fan units 120 may be provided on the rear panel 114, or a single suction inlet 140 corresponding to the entire size of the diagonal flow fan units 120 may be provided on the rear panel 114. The sizes of the suction inlets 140 may be different from each other. That is, one of the suction inlets 140 may be disposed on a corresponding one of the diagonal flow fan units 120, while another one of the suction inlets 140 may be disposed on at least two corresponding ones of the diagonal flow fan units 120.

As shown in FIG. 6, the air introduced into the housing 110 through the suction inlets 140 absorbs or loses heat while passing through the heat exchanger 130. The air that has exchanged heat while passing the heat exchanger 130 is suctioned by the diagonal flow fan 123 and discharged to the outside of the housing 110 via the duct 124 and the discharge outlet 121a. Here, the angle formed by the direction in which the air is suctioned into the diagonal flow fan 123 and the direction in which the air is discharged through the discharge outlet 121a is between about 15° and about 60°.

The indoor unit 100 according to the illustrated embodiment may include a plurality of diagonal flow fan units 120, a plurality of the heat exchangers 130 and a plurality of suction inlets 140. A description will be given of a case in which the plurality of diagonal flow fan units 120, the plurality of heat exchangers 130, and the plurality of suction inlets 140 are arranged at the upper portion, middle portion and lower portion of the indoor unit 100 in a longitudinal direction of the indoor unit 100 as shown in FIG. 5.

The plurality of diagonal flow fan units 120 includes a first diagonal flow fan unit 120a, a second diagonal flow fan unit 120b and a third diagonal flow fan unit 120c which are disposed spaced apart from each other in the longitudinal direction of the indoor unit 100. The plurality of heat exchangers 130 includes a first heat exchanger 130a, a second heat exchanger 130b and a third heat exchanger 130c which are disposed spaced apart from each other between the diagonal flow fan units 120 and the suction inlets 140 in the longitudinal direction of the indoor unit 100. The plurality of suction inlets 140 includes a first suction inlet 140a, a second suction inlet 140b and a third suction inlet 140c disposed at the rear portion of the heat exchangers 130 spaced apart from each other in the longitudinal direction of the indoor unit 100.

The first diagonal flow fan unit 120a, the first heat exchanger 130a and the first suction inlet 140a are arranged in a row or in a horizontal direction. The second diagonal flow fan unit 120b, the second heat exchanger 130b and the second suction inlet 140b are arranged in a row or in a horizontal direction under the first diagonal flow fan unit 120a, the first heat exchanger 130a and the first suction inlet 140a. The third diagonal flow fan unit 120c, the third heat exchanger 130c and the third suction inlet 140c are arranged in a row or in a horizontal direction under the second diagonal flow fan unit 120b, the second heat exchanger 130b and the second suction inlet 140b.

As the diagonal flow fan units 120a, 120b and 120c, the heat exchangers 130a, 130b and 130c, and the suction inlets 140a, 140b and 140c disposed at the upper, middle and lower portions of the indoor unit 100 in the longitudinal direction of the indoor unit 100 are arranged in rows or in a horizontal direction, the indoor unit 100 may have a slim width. In addition, as the flow passage between the suction inlet 140 and the discharge outlet 121a is shortened, the operational efficiency of the indoor unit 100 may be increased, while the noise level is lowered.

The first diagonal flow fan unit 120a, the second diagonal flow fan unit 120b and the third diagonal flow fan unit 120c may be independently turned on/off and controlled to rotate at different speeds. The first heat exchanger 130a, the second heat exchanger 130b and the third heat exchanger 130c corresponding respectively to the first diagonal flow fan unit 120a, the second diagonal flow fan unit 120b and the third diagonal flow fan unit 120c may be independently controlled such that a refrigerant is supplied thereto depending on the operational state (ON/OFF) of the first diagonal flow fan unit 120a, the second diagonal flow fan unit 120b and the third diagonal flow fan unit 120c. For example, when the first diagonal flow fan unit 120a and the second diagonal flow fan unit 120b are operated (turned on) and the third diagonal flow fan unit 120c is at rest (turned off), the refrigerant may be controlled to be supplied to the first heat exchanger 130a and the second heat exchanger 130b corresponding to the first diagonal flow fan unit 120a and the second diagonal flow fan unit 120b but not to be supplied to the third heat exchanger 130c corresponding to the third diagonal flow fan unit 120c. Although not shown, supply of refrigerant to the first heat exchanger 130a may be controlled by installing valves to shut off the flow passages between refrigerant pipes respectively connected to the first heat exchanger 130a, the second heat exchanger 130b and third heat exchanger 130c and each of the third heat exchanger 130c, the second heat exchanger 130b and the third heat exchanger 130c or by installing a single valve (e.g., a 3-way valve) having a plurality of ports connected to the first heat exchanger 130a, the second heat exchanger 130b and third heat exchanger 130c. The number of valves may not be limited thereto, for example, at least one valve may be provided to shut off the flow passages. At least one valve may be a pneumatic valve and/or an electronic valve using a solenoid. However, any valve suitable to control the flow passage may be used.

Hereinafter, a description will be given of a method of controlling such an indoor unit 100 of an air conditioner having a structure as above.

Figure 7A:
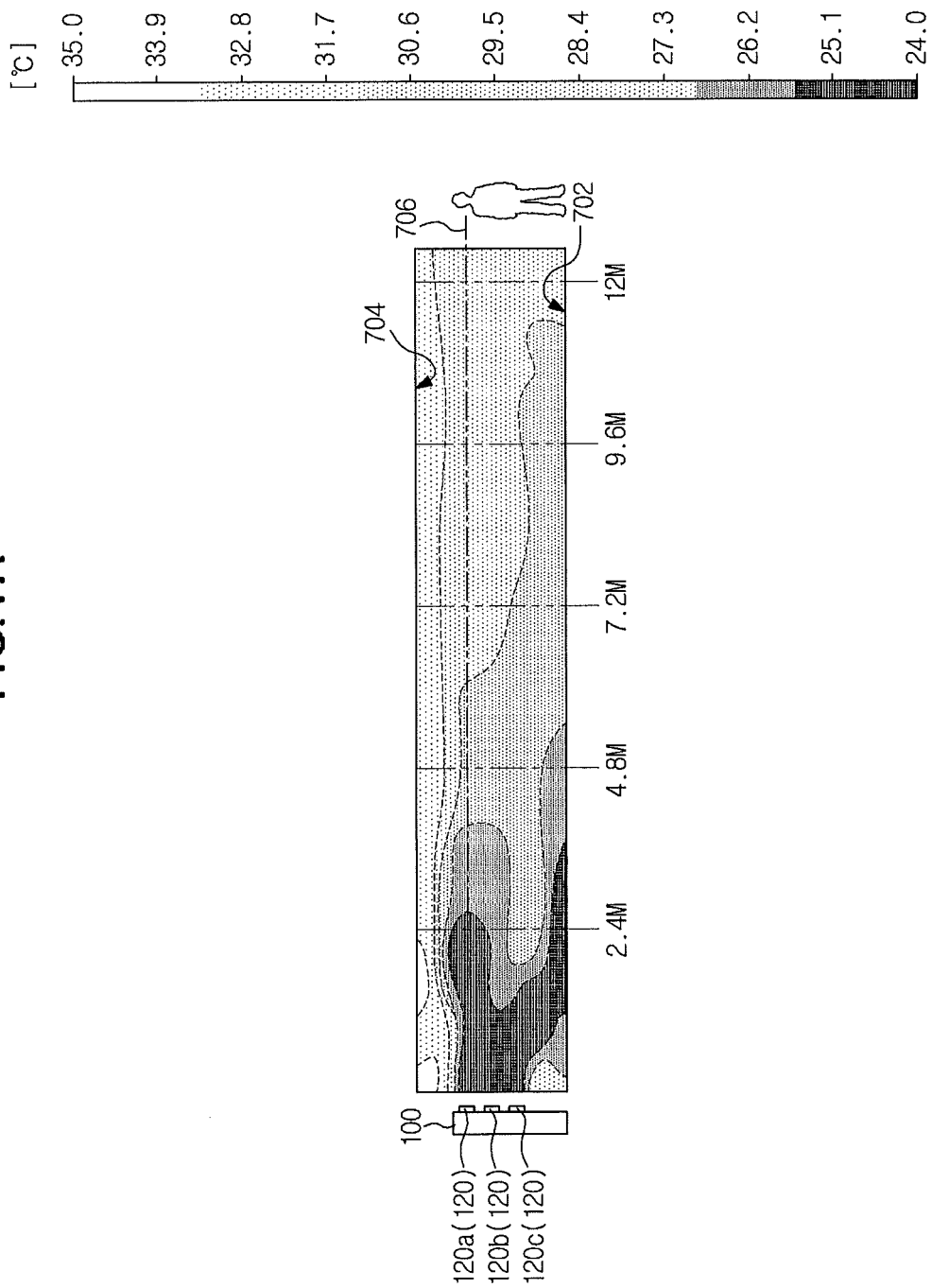
Figure 7C:
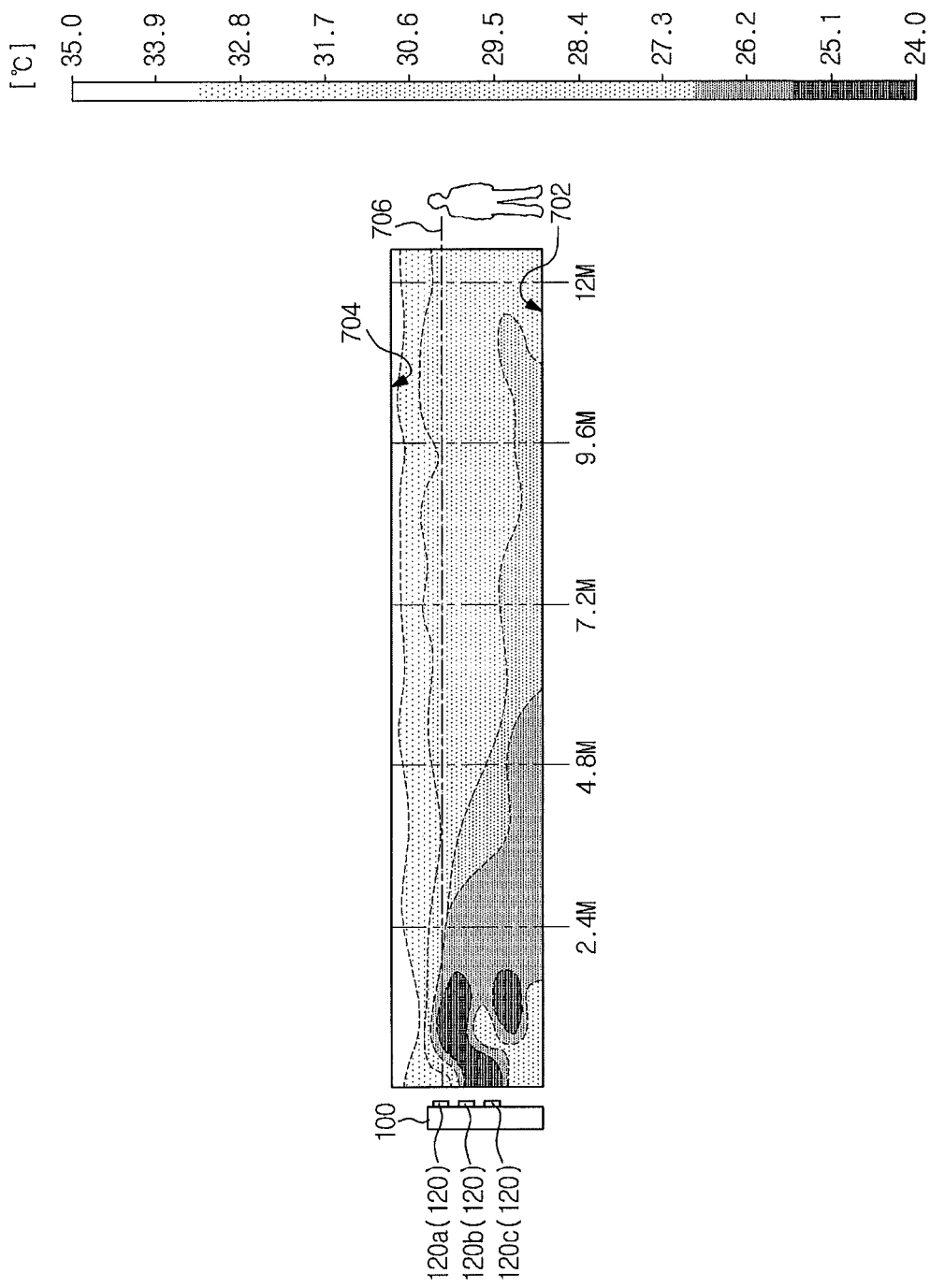
Figure 7D:
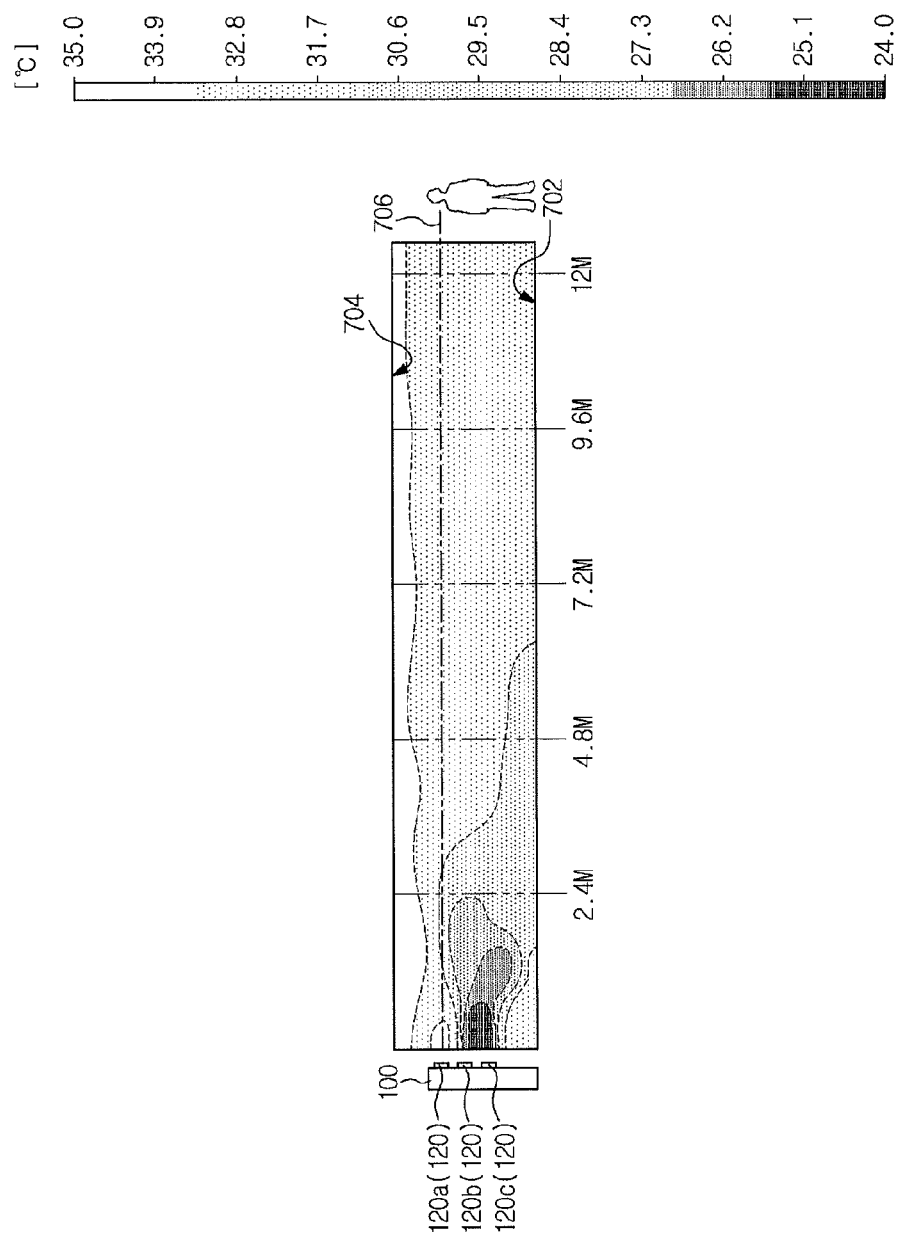
Figure 8:
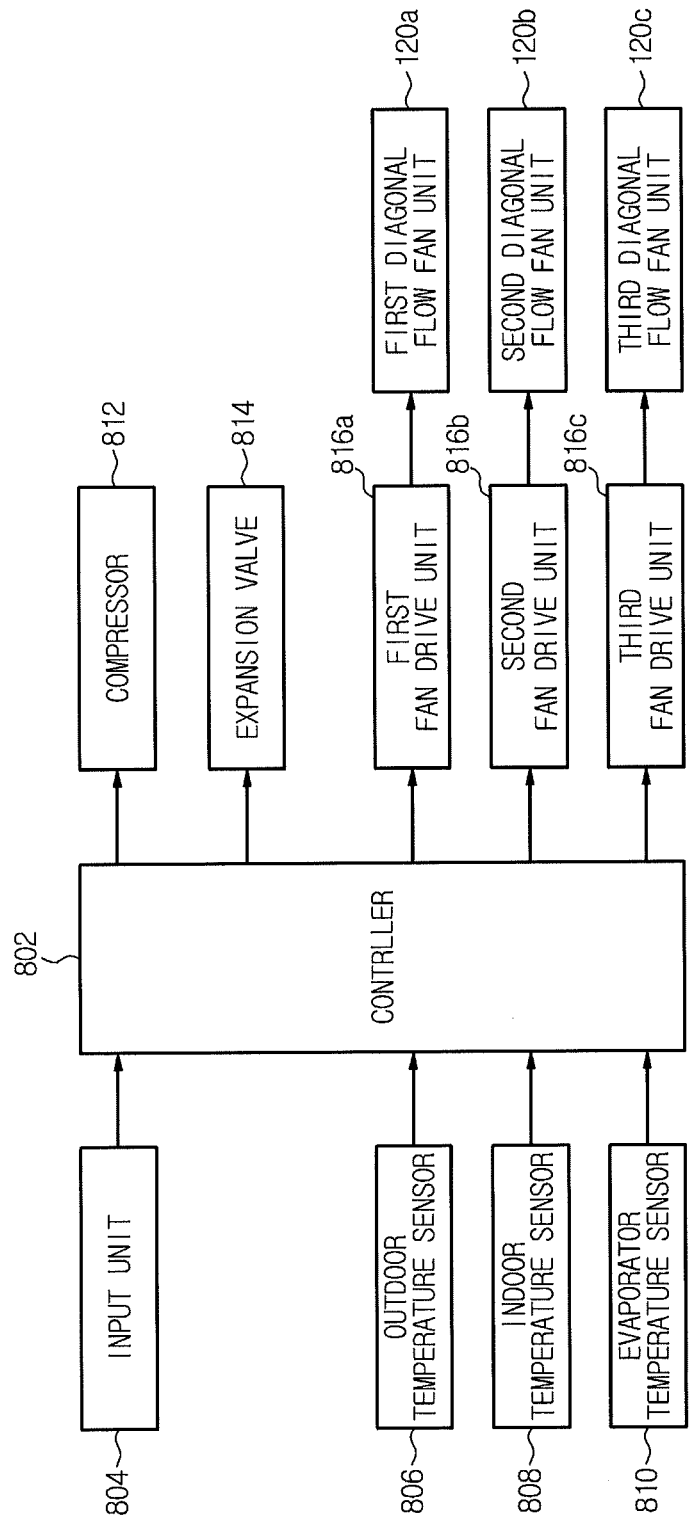
FIG. 8 is a view illustrating a control system of the air conditioner according to the illustrated embodiment of the present disclosure.
Figure 9:
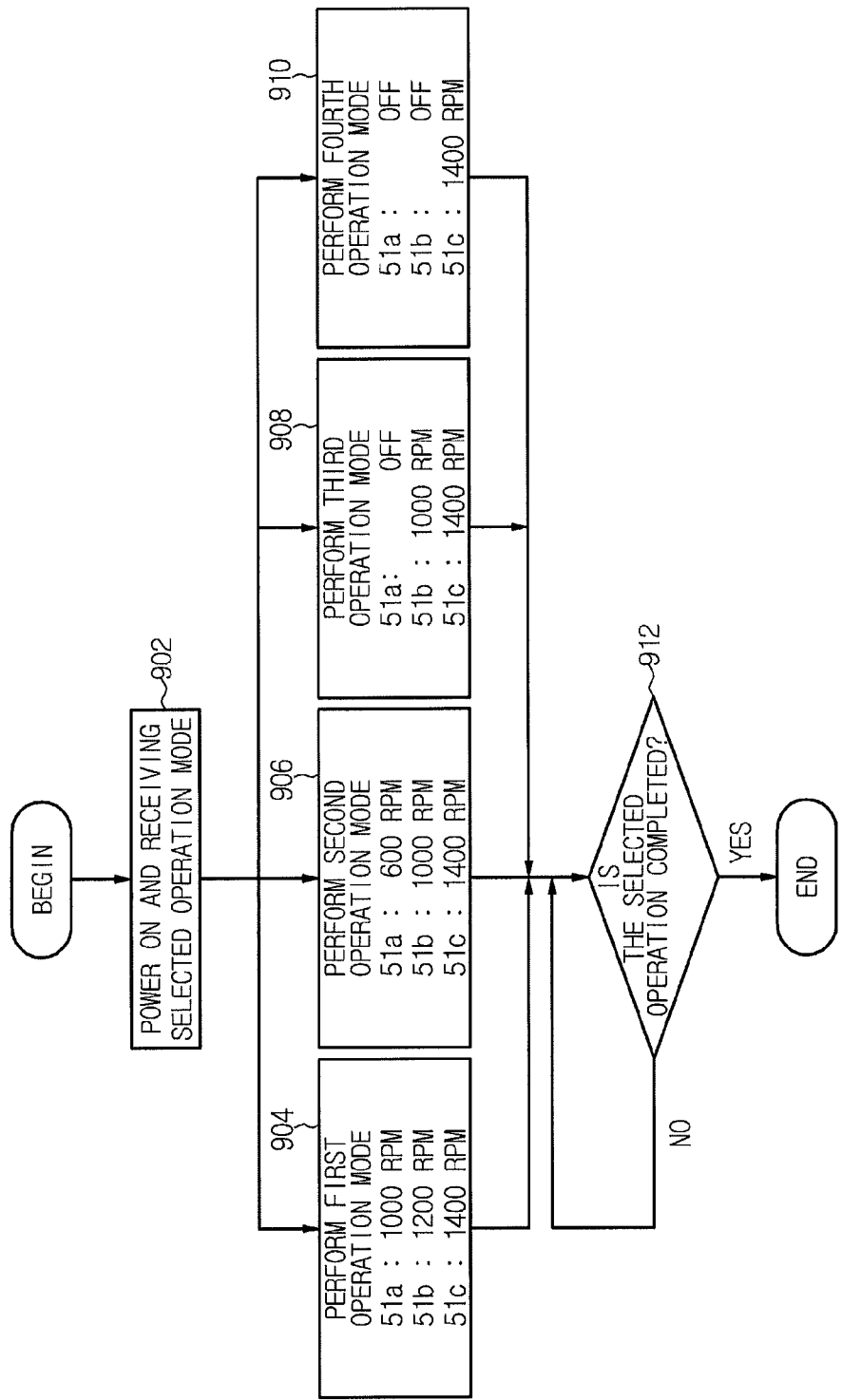
FIG. 9 is a view illustrating a method of controlling the air conditioner according to the illustrated embodiment of the present disclosure, based on FIGS. 7A-7D.

FIGS. 7A-7D are views illustrating the temperature distribution of air discharged from the discharge outlet in respective operation modes of the indoor unit of the air conditioner according to the illustrated embodiment of the present disclosure, FIG. 8 is a view illustrating a control system of the air conditioner according to the illustrated embodiment of the present disclosure, and FIG. 9 is a view illustrating a method of controlling the air conditioner according to the illustrated embodiment of the present disclosure, based on FIGS. 7A-7D.

FIGS. 7A-7D show the temperature distribution of the air discharged from the discharge outlet 121a in respective operation modes of the indoor unit 100 of the air conditioner according to the illustrated embodiment of the present disclosure. The indoor unit 100 is provided with a plurality of diagonal flow fan units 120a, 120b and 120c which are arranged in a vertical direction (or a longitudinal direction of the indoor unit 100) and perform a desired air conditioning operation by adjusting the flow rate and speed of the air discharged from the diagonal flow fan units 120a, 120b and 120c. The adjustment of the flow rate and speed of the air discharged from the diagonal flow fan units 120a, 120b and 120c is implemented by independently turning on/off the diagonal flow fan units 120a, 120b and 120c and independently controlling the rate of rotation or revolutions per minute (RPM) of the at least one diagonal flow fan unit 120a, 120b and 120c.

In FIGS. 7A-7D, reference numeral 702 represents the bottom surface of the air conditioning space. Reference numeral 704 represents the ceiling of the air conditioning space, which is about 250 cm above the bottom surface 702. Reference numeral 706 represents a breathing line at a level (e.g. about 165 cm) at which the nose and eyes of an adult of average height (e.g., about 180 cm) are arranged.

FIG. 7A shows a first operation mode, in which the first diagonal flow fan unit 120a, the second diagonal flow fan unit 120b and the third diagonal flow fan unit 120c are all operated (turned on), and the rates of rotation of the first diagonal flow fan unit 120a, the second diagonal flow fan unit 120b and the third diagonal flow fan unit 120c are different from each other. That is, FIG. 7A shows a case in which the rate of rotation of the first diagonal flow fan unit 120a is about 1000 RPM, the rate of rotation of the second diagonal flow fan unit 120b is about 1200 RPM, and the rate of rotation of the third diagonal flow fan unit 120c is about 1400 RPM. In this case, the refrigerant may be controlled to be supplied to all of the first heat exchanger 130a, the second heat exchanger 130b and the third heat exchanger 130c respectively corresponding to the first diagonal flow fan unit 120a, the second diagonal flow fan unit 120b and the third diagonal flow fan unit 120c.

Since the first diagonal flow fan unit 120a, the second diagonal flow fan unit 120b and the third diagonal flow fan unit 120c are all operated (turned on), a large amount air is discharged and transferred to a far distance, and thus this operation is suitable for air conditioning of a wide area.

FIG. 7B shows a second operation mode, in which the first diagonal flow fan unit 120a, the second diagonal flow fan unit 120b and the third diagonal flow fan unit 120c are all operated (turned on), and the rates of rotation of the first diagonal flow fan unit 120a, the second diagonal flow fan unit 120b and the third diagonal flow fan unit 120c are controlled differently from each other. In this mode, the rates of rotation of the first diagonal flow fan unit 120a and the second diagonal flow fan unit 120b are lower than in the mode of FIG. 7A. That is, the rate of rotation of the first diagonal flow fan unit 120a is about 600 RPM, the rate of rotation of the second diagonal flow fan unit 120b is about 1000 RPM, and the rate of rotation of the third diagonal flow fan unit 120c is about 1400 RPM. In this case, the refrigerant may be controlled to be supplied to all of the first heat exchanger 130a, the second heat exchanger 130b and the third heat exchanger 130c respectively corresponding to the first diagonal flow fan unit 120a, the second diagonal flow fan unit 120b and the third diagonal flow fan unit 120c, as in the first mode.

In the case of FIG. 7B, the air conditioning effect reaches a distance similar to that in FIG. 7C, but the air conditioning is usually implemented below the breathing line 802. In this case, the rates of rotation of the first diagonal flow fan unit 120a and the second diagonal flow fan unit 120b are relatively low compared to the case of FIG. 7A, and thus quiet operation may be possible and energy consumption may be reduced even though the height the effect of air conditioning reaches is relatively low compared to the case shown in FIG. 7A.

FIG. 7C shows a third operation mode, in which the first diagonal flow fan unit 120a is at rest (turned off), the second diagonal flow fan unit 120b and the third diagonal flow fan unit 120c are operated (turned on), and the rates of rotation of the second diagonal flow fan unit 120b and the third diagonal flow fan unit 120c are different from each other. That is, the first diagonal flow fan unit 120a is maintained at rest, the rate of rotation of the second diagonal flow fan unit 120b is about 1000 RPM, and the rate of rotation of the third diagonal flow fan unit 120c is about 1400 RPM. In this case, the refrigerant may be controlled not to be supplied to the first heat exchanger 130a corresponding to the first diagonal flow fan unit 120a, while being supplied to the second heat exchanger 130b and the third heat exchanger 130c corresponding respectively to the second diagonal flow fan unit 120b and the third diagonal flow fan unit 120c.

Compared to the cases of FIGS. 7A and 7B, the distance and height that the effect of air conditioning in FIG. 7C reaches further decrease. In case of FIG. 7C, the first diagonal flow fan unit 120a is not operated, and thus quiet operation may be possible and energy consumption may be reduced even though the area that the effect of air conditioning reaches is relatively small compared to those of FIGS. 7A and 7B.

FIG. 7D shows a fourth operation mode, in which the first diagonal flow fan unit 120a and the second diagonal flow fan unit 120b are at rest (turned off), and the third diagonal flow fan unit 120c alone is operated (turned on). The rate of rotation of the third diagonal flow fan unit 120c is about 1400 RPM. In this case, the refrigerant may be controlled not to be supplied to the first heat exchanger 130a and the second heat exchanger 130b corresponding to the first diagonal flow fan unit 120a and the second diagonal flow fan unit 120b, while being supplied to the third heat exchanger 130c corresponding to the third diagonal flow fan unit 120c.

Compared to the cases of FIGS. 7A, 7B and 7C, the distance and height that the effect of air conditioning in FIG. 7D reaches greatly decrease. In case of FIG. 7D, the first diagonal flow fan unit 120a and the second diagonal flow fan unit 120b are not operated, and thus quieter operation and reduction of energy consumption may be achieved even though the area that the effect of air conditioning reaches is relatively small compared to those of FIGS. 7A, 7B and 7C. The mode of FIG. 7D is useful when air conditioning effect needs to be concentrated at an area in the air conditioning space which is close to the front surface of the indoor unit 100.

The control of turning on/off the first diagonal flow fan unit 120a, the second diagonal flow fan unit 120b and the third diagonal flow fan unit 120c and the rates of rotation thereof is not limited to embodiments of FIGS. 7A-7D. Various air conditioning effects may be realized through various combinations.

FIG. 8 shows a control system of the air conditioner according to the illustrated embodiment of the present disclosure. As shown in FIG. 8, an input unit 804, an outdoor temperature sensor 806, an indoor temperature sensor 808, and an evaporator temperature sensor 810 are electrically connected to the input of the controller 802, which controls overall operation of the air conditioner, to communicate with the controller 802, while a compressor 812, an expansion valve 814, a first fan drive unit 816a, a second fan drive unit 816b, and a third fan drive unit 816c are electrically connected to the output of the controller 802 to communicate with the controller 802. The first fan drive unit 816a, the second fan drive unit 816b and the third fan drive unit 816c, which function to respectively drive the first diagonal flow fan unit 120a, the second diagonal flow fan unit 120b and the third diagonal flow fan unit 120c, operate according to commands from the controller 802 to turn on/off the first diagonal flow fan unit 120a, the second diagonal flow fan unit 120b and the third diagonal flow fan unit 120c and control the rates of rotation thereof. The controller 802 transfers commands respectively to the first fan drive unit 816a, the second fan drive unit 816b and the third fan drive unit 816c to control ON/OFF and the rates of rotation of the first diagonal flow fan unit 120a, the second diagonal flow fan unit 120b and the third diagonal flow fan unit 120c in correspondence with an operation mode selected by a user.

FIG. 9 shows a method of controlling the air conditioner according to the illustrated embodiment of the present disclosure, based on FIGS. 7A-7D. The control method in FIG. 9 is performed by the control system shown in FIG. 8. As shown in FIG. 9, when the user turns on the air conditioner and selects a desired operation mode, the controller 802 of the air conditioner receives the information about the operation mode selected by the user, generates a control signal corresponding to the received operation mode and transfers the signal to each part of the air conditioner such that the targeted operation is implemented (902).

If the selected operation mode is the first operation mode, the controller 802 transfers a control command for implementation of the first operation mode to the first fan drive unit 816a, the second fan drive unit 816b and the third fan drive unit 816c such that the first diagonal flow fan unit 120a rotates at about 1000 RPM, the second diagonal flow fan unit 120b rotates at about 1200 RPM, and the third diagonal flow fan unit 120c rotates at about 1400 RPM (904).

If the selected operation mode is the second operation mode, the controller 802 transfers a control command for implementation of the second operation mode to the first fan drive unit 816a, the second fan drive unit 816b and the third fan drive unit 816c such that the first diagonal flow fan unit 120a rotates at about 600 RPM, the second diagonal flow fan unit 120b rotates at about 1000 RPM, and the third diagonal flow fan unit 120c rotates at about 1400 RPM (906).

If the selected operation mode is the third operation mode, the controller 802 transfers a control command for implementation of the third operation mode to the first fan drive unit 816a, the second fan drive unit 816b and the third fan drive unit 816c such that first diagonal flow fan unit 120a is turned off, the second diagonal flow fan unit 120b rotates at about 1000 RPM, and the third diagonal flow fan unit 120c rotates at about 1400 RPM (908).

If the selected operation mode is the fourth operation mode, the controller 802 transfers a control command for implementation of the fourth operation mode to the first fan drive unit 816a, the second fan drive unit 816b and the third fan drive unit 816c such that the first diagonal flow fan unit 120a and the second diagonal flow fan unit 120b are turned off, and the third diagonal flow fan unit 120c rotates at about 1400 RPM (910).

When the selected operation mode is implemented as above and completed, the operation of the air conditioner is ended (912).

Figure 10:
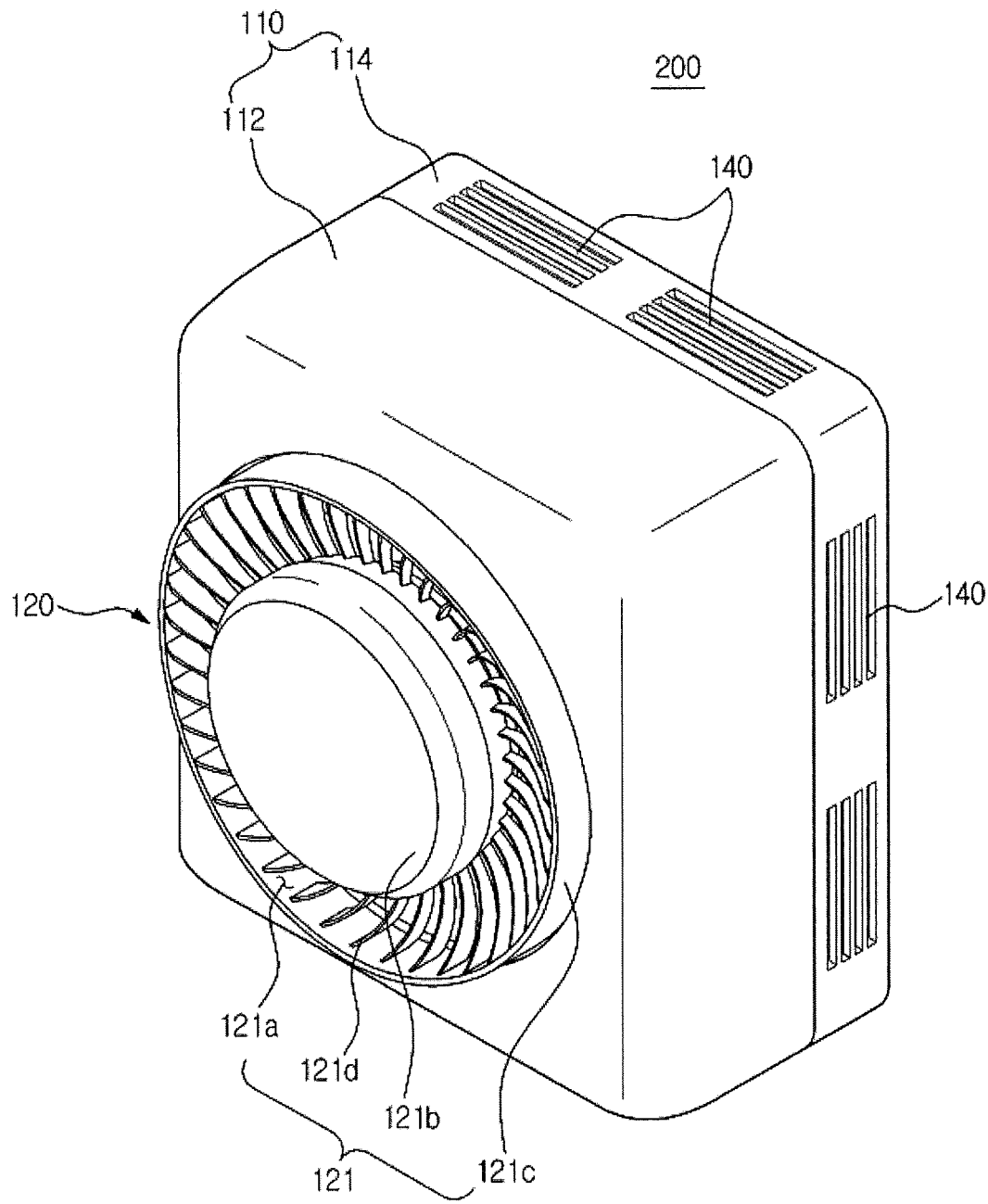
FIG. 10 is a view illustrating an indoor unit of an air conditioner according to another embodiment of the present disclosure.
Figure 11:
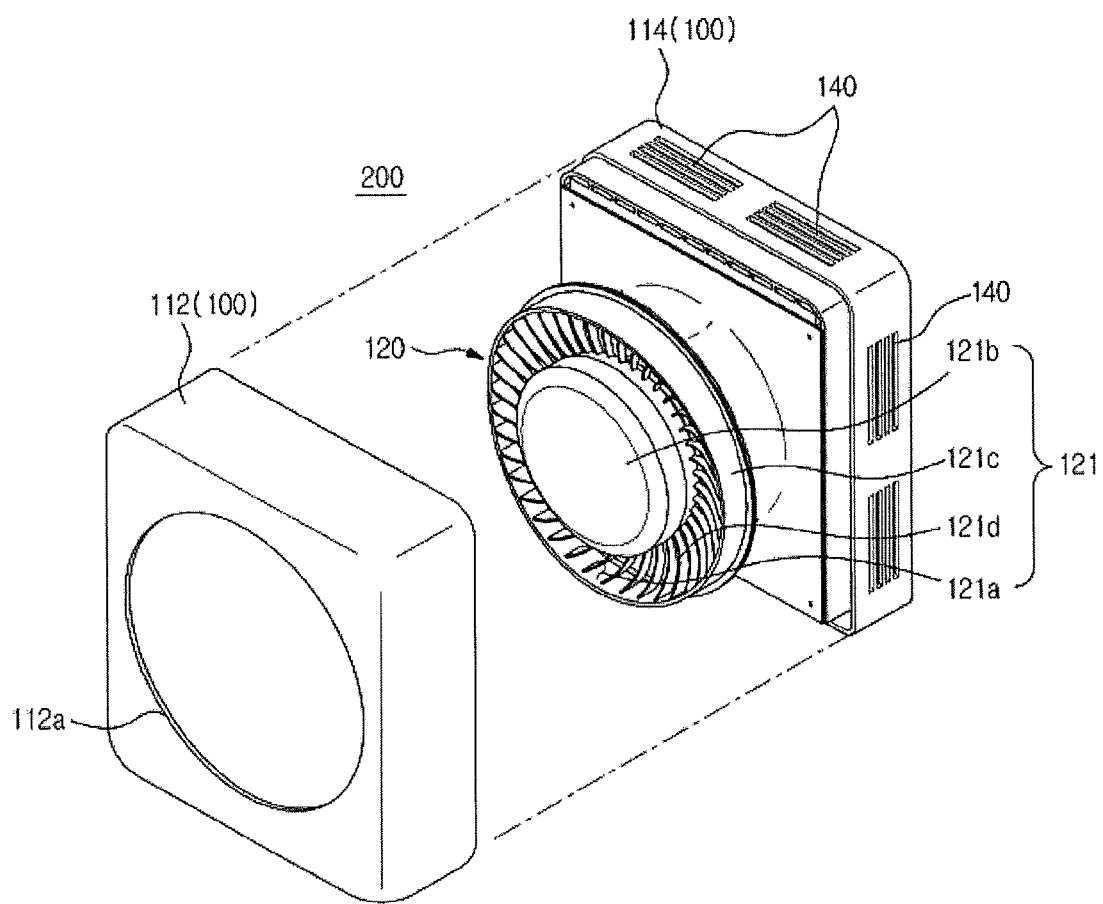
FIG. 11 is a view illustrating the indoor unit shown in FIG. 10, in which the front panel is separated from the indoor unit.

FIG. 10 is a view illustrating an indoor unit of an air conditioner according to another embodiment of the present disclosure, and FIG. 11 is a view illustrating the indoor unit shown in FIG. 10, in which the front panel is separated from the indoor unit.

As shown in FIGS. 10 and 11, the indoor unit 200 includes one diagonal flow fan unit 120a, and an opening 112a is provided in the front panel 112 to couple the diagonal flow fan unit 120a to the front panel 112. Other configurations and operational mechanism are the same as those of the indoor unit of air conditioner 100 according to the previous embodiment of the present disclosure and thus a detailed description thereof will be omitted.

Figure 12:
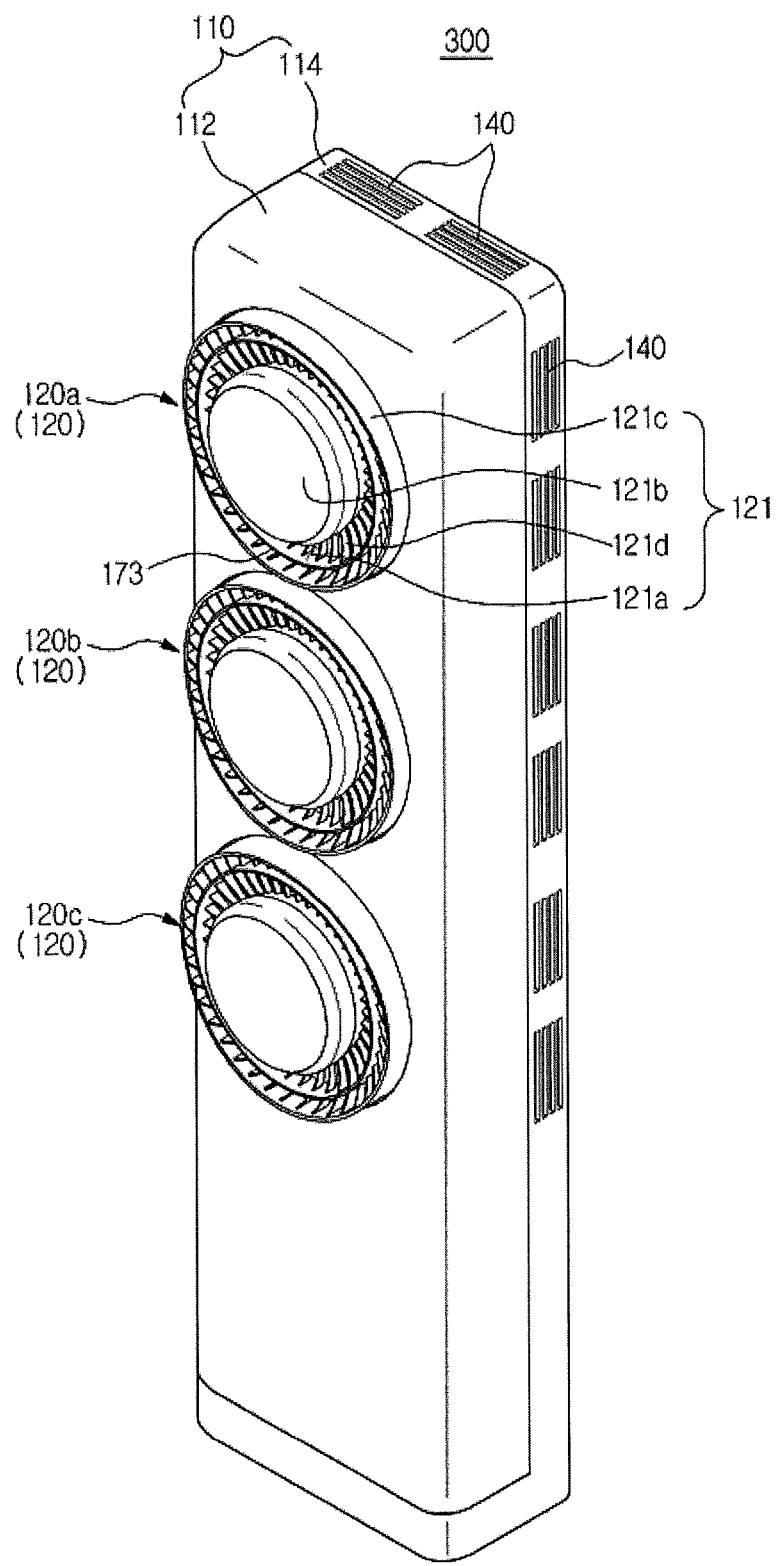
FIG. 12 is a view illustrating an indoor unit of an air conditioner according to another embodiment of the present disclosure.
Figure 13:
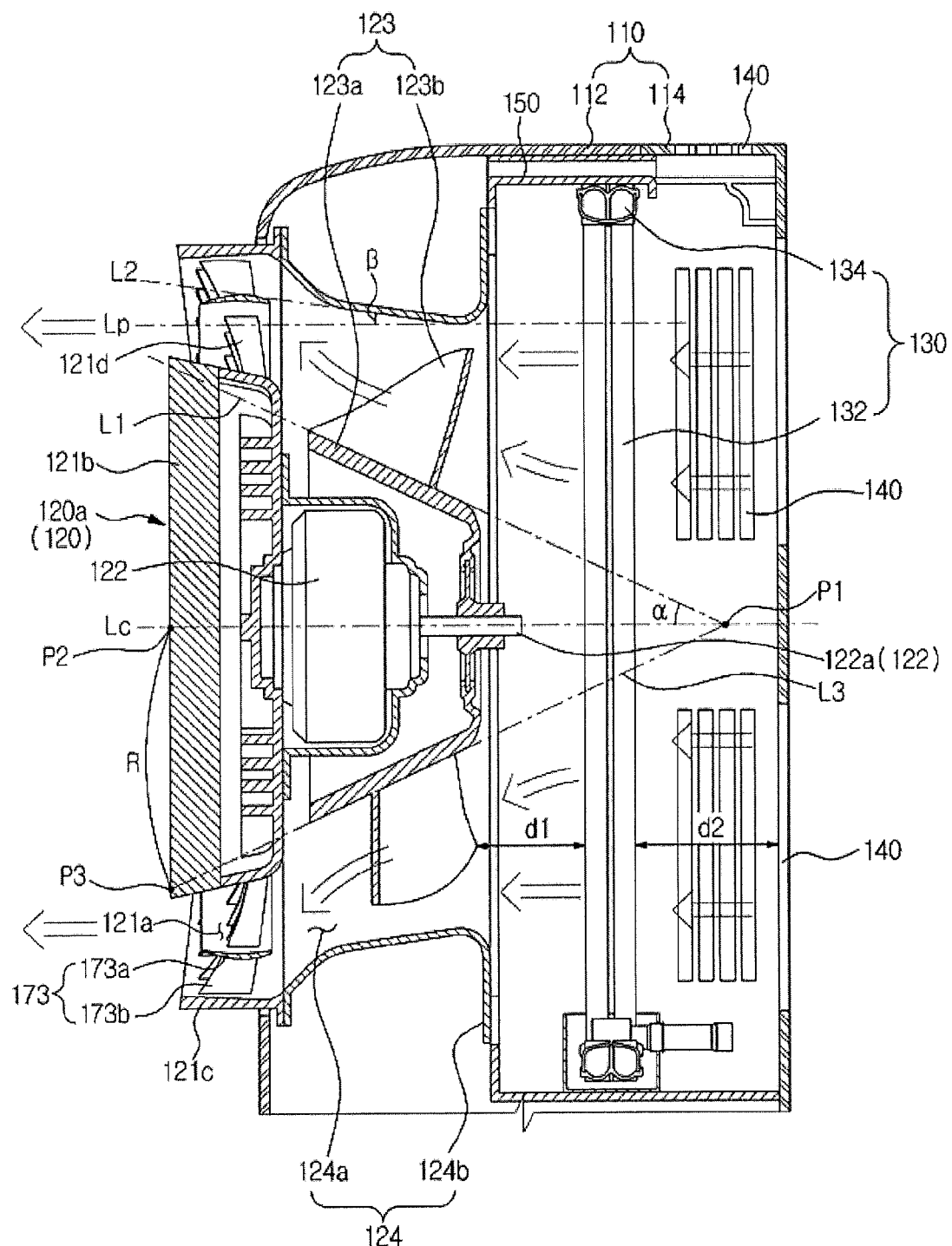
FIG. 13 is a cross-sectional view illustrating the indoor unit shown in FIG. 12.

FIG. 12 is a view illustrating an indoor unit of an air conditioner according to another embodiment of the present disclosure, and FIG. 13 is a cross-sectional view illustrating the indoor unit shown in FIG. 12.

As shown in FIGS. 12 and 13, a diffuser 121 of a diagonal flow fan unit 120 of an indoor unit 300 includes a guide vane 173 to prevent the diagonal flow fan 123 from being exposed through the discharge outlet 121a and guide flow of air discharged through the discharge outlet 121a.

The guide vane 173, arranged between a circular disc plate 121b and a grille 121c, may include a first vane 173a spaced apart from the circular disc plate 121b in a circumferential direction and formed in a ring shape, and a second vane 153b extending from the outer circumferential surface of the first vane 173a to the inner circumferential surface of the grille 121c.

The first vane 173a may include a radial inner surface facing the circular disc plate 121b, and a radial outer surface facing the grille 121c.

The rear end portion of the inner surface of the first vane 173a, which is positioned at the inner portion of the discharge outlet 121a, may be formed to be inclined with respect to the axial direction of the diagonal flow fan 123, as in the case of the flow passage forming duct 124a. However, the inclination angle may decrease as the inner surface extends from the rear end portion to the front such that the front portion thereof is parallel to the axial direction of the diagonal flow fan 123.

The rear end portion of the radial inner lateral surface of the first vane 173a may be formed to have a predetermined inclination with respect to the axial direction of the diagonal flow fan 123, but the inclination may decrease as the radial inner lateral surface extends from the rear end portion thereof to the front such that the front end portion thereof is parallel to the axial direction of the diagonal flow fan 123.

By the first vane 173a formed as above, part of cool air slantingly discharged by the diagonal flow fan 123 and the flow passage forming duct 124a with respect to the axial direction of the diagonal flow fan 123 is guided in the axial direction of the diagonal flow fan 123 through the inner and outer surfaces of the first vane 173a. In addition, the radial outer surface of the first vane 173a is generally curved outward, and thus the cross section of the first vane 173a may be generally provided in a streamline shape. Accordingly, the cool air discharged from the discharge outlet 121a in the direction parallel to the axial direction of the diagonal flow fan 123 by the first vane 173a is guided out of the discharge outlet 121a and allowed to reach a far distance from the discharge outlet 121a, and the cool air discharged from the discharge outlet 121a at an inclination angle with respect to the axial direction of the diagonal flow fan 123 is allowed to reach an area of wide angle from the discharge outlet 121a.

The second vane 173b may be radially formed in the discharge outlet 121a, and multiple second vanes 173b may be arranged equally spaced apart throughout the entirety of the discharge outlet 121a. In addition, the second vane 173b may be formed in a curved line to rotate in one direction about the axis of the diagonal flow fan 123 to guide formation of a rotating air stream when the cool air is discharged from the discharge outlet 121a.

The rotating air stream formed in the discharged air stream may function to extend the discharge distance such that the cool air reaches a considerable distance from the indoor unit 100.

The diffuser 121 provided with the first vane 173a and the second vane 173b as above may be formed by injection molding, and the first vane 173a and the second vane 173b may be integrated with the grille 121c formed around the circular disc plate 121b and the discharge outlet 121a.

In the illustrated embodiment, one first vane 173a is provided in the discharge outlet 121a. However, this is simply for illustration, and a plurality of first vanes 173a may be provided in the discharge outlet 121a in a radial direction.

Other constituents and operational mechanisms are the same as those of the indoor unit 100 of an air conditioner according to the previous embodiment and thus a detailed description thereof will be omitted.

Figure 14:
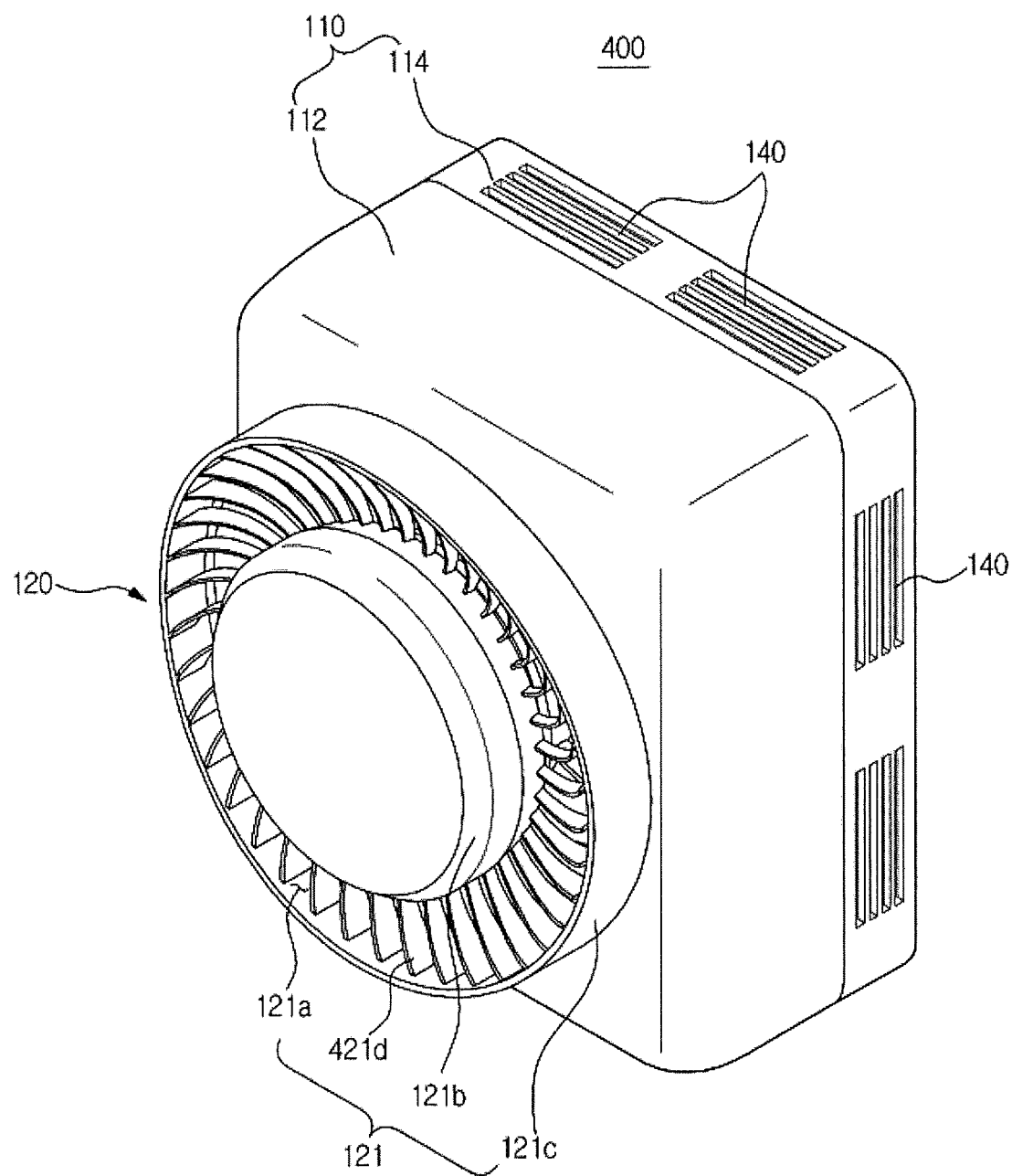
FIG. 14 is a view illustrating an indoor unit of an air conditioner according to a further embodiment of the present disclosure.
Figure 15A:
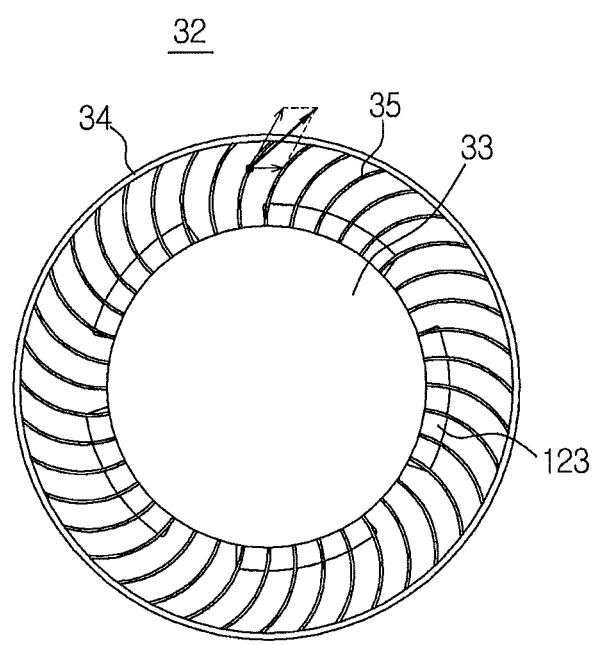
FIG. 15 is a view showing the shape of a diffuser (a) of an indoor unit of an air conditioner according to the conventional art and the shape of a diffuser (b) of an indoor unit of an air conditioner according to another embodiment of the present disclosure.
Figure 15B:
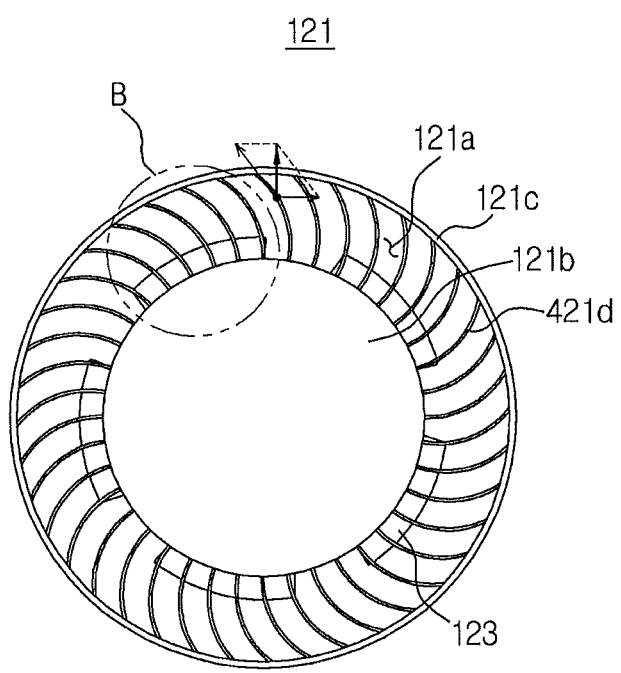
Figure 16:
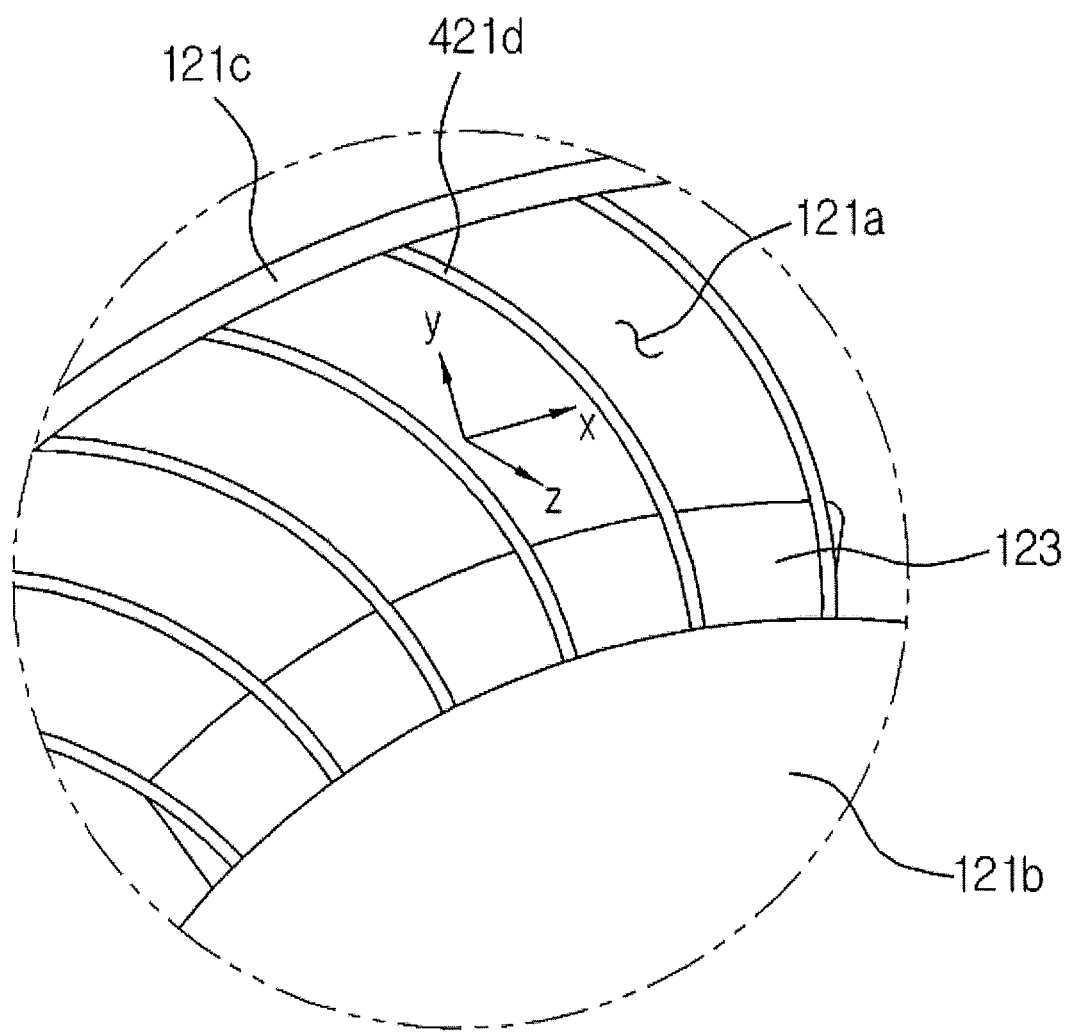
FIG. 16 is an enlarged view showing section 'B' of FIG. 15.
Figure 17:
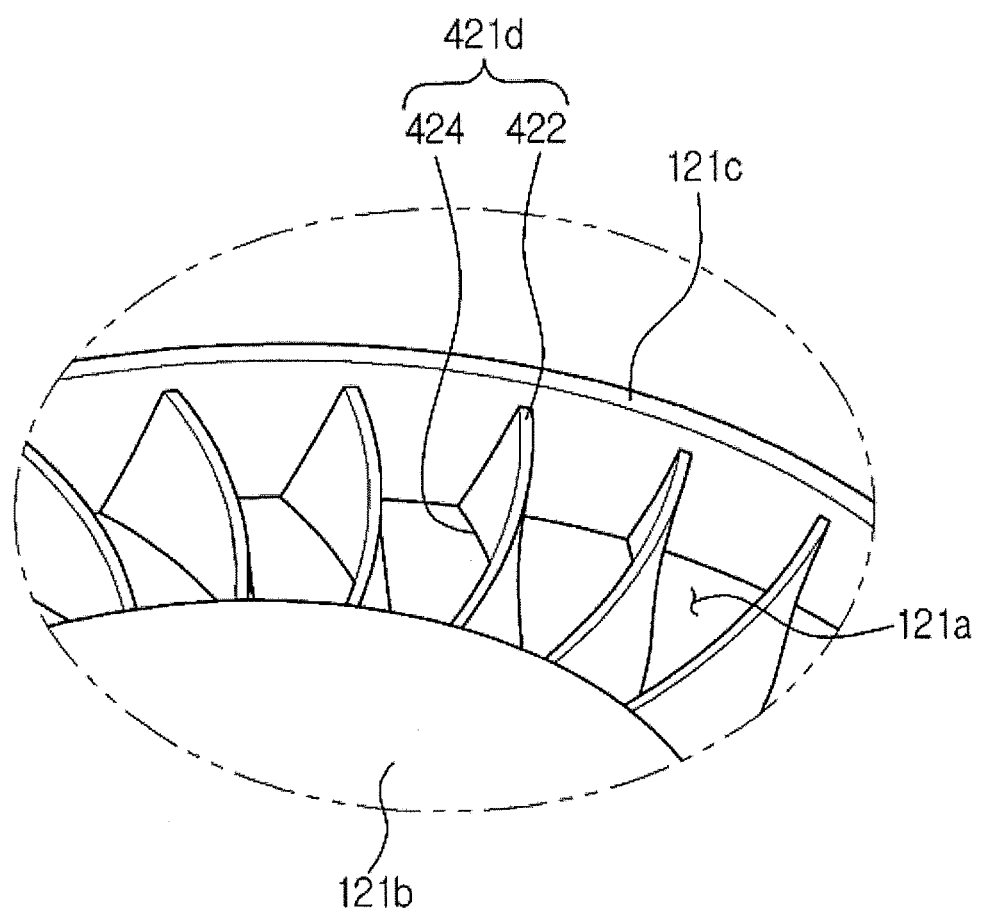
FIG. 17 is a perspective view of FIG. 16.

FIG. 14 is a view illustrating an indoor unit of an air conditioner according to a further embodiment of the present disclosure. FIG. 15 is a view showing the shape of a diffuser (a) of an indoor unit of an air conditioner according to the conventional art and the shape of a diffuser (b) of an indoor unit of an air conditioner according to another embodiment of the present disclosure. FIG. 16 is an enlarged view showing section 'B' of FIG. 15, and FIG. 17 is a perspective view of FIG. 16.

As shown in FIGS. 14 to 17, a diffuser 121 of a diagonal flow fan unit 120 of an indoor unit 400 includes a circular disc plate 121b, a circular grille 121c coupled to the outer circumferential surface of the circular disc plate 121b, a ring-shaped discharge outlet 121a formed between the circular disc plate 121b and the grille 121c. The diffuser 121 is disposed at the front of a diagonal flow fan 123 to discharge the air passing the diagonal flow fan 123 to the outside of the front panel 112 through the discharge outlet 121a. The grille 121c includes blade plates 421d, and the flow direction and flow rate of the air discharged through the discharge outlet 121a may be adjusted by changing the number, shape and orientation of the blade plates 421d.

The blade plate 421d is formed in the shape of a spiral blade to extend from the circular disc plate 121b to the grille 121c, and thereby guiding discharge of the air blowing from the diagonal flow fan 123 to the outside.

The blade plate 421d is formed to extend from the circular disc plate 121b to the grille 121c in a first direction. The first direction, which may be one of various directions including a spiral direction and a radial direction extending from the circular disc plate 121b to the grille 121c, is assumed to be the radial direction in the illustrated embodiment.

The blade plate 421d extends in the first direction and is curved in a direction opposite to that of rotation of the diagonal flow fan 123. If the diagonal flow fan 123 rotates clockwise when viewed from the front of the diffuser 121, the blade plate 421d extends from the circular disc plate 121b to the grille 121c and is curved counterclockwise. If the diagonal flow fan 123 rotates counterclockwise, the blade plate 421d extends from the circular disc plate 121b to the grille 121c and is curved clockwise.

In conventional cases, if the blade plate 35 extends from a disc plate 33 to a grille 34 and is curved clockwise, i.e., if the blade plate 35 is curved in the same direction as that of rotation of the diagonal flow fan 123, the discharged air blowing from the diagonal flow fan 123 is guided by the blade plate 35 to form a diffuse air stream rather than a front air stream. In contrast, when the blade plate is configured as in the illustrated embodiment, diffusing of the discharged air in all directions is blocked and instead the diffuse air stream is transformed into a front air stream by the blade plate 421d. That is, when the axis lying in the direction toward the front of the diffuser 121 is defined as the z-axis, the axis lying in a radial direction toward the center of the diffuser 121 is defined as the y-axis and the axis lying in the direction of the tangent line of the diffuser 121 having a circular shape is defined as the x-axis, components of the discharged air from the diagonal flow fan 123 blowing in the directions of the x and y axes are guided to the z-axis by the blade plate 421d.

The shape of the spiral blade of the blade plate 421d may be formed by a rib having a predetermined width. The blade plate 421d serves to protect the internal components of the indoor unit 100 such as the diagonal flow fan 123, but is primarily intended to guide discharged air from the diagonal flow fan 123 to form an air stream. Therefore, the blade plate 421d is formed by a rib having a predetermined width sufficient to guide the discharged air.

The blade plate 421d includes a front portion 422 facing in the front direction, and a rear portion 424 facing in the rear direction. The angle at which the front portion 422 is curved may be different from the angle at which the rear portion 424 is curved. The blade plate 421d may be divided, with respect to the middle portion of the lateral surface, into the front portion 422 facing in the front direction of the front panel and the rear portion 424 facing in the rear direction of the front panel. The blade plate 421d extends in a first direction heading from the circular disc plate 121b to the grille 121c, and is curved in a direction opposite to the direction of rotation of the diagonal flow fan 123. Curving the front portion 422 and the rear portion 424 at different angles is more effective in forming a front air stream.

In the configuration as above, the rear portion 424 may be more curved than the front portion 422 in consideration of formation of a front air stream. The rear portion 424 is more curved than the front portion 422, and thus as the blade plate 421d extends from the rear portion 424 to the front portion 422, the lateral surface of the blade plate 421d becomes approximately parallel to the front surface of the diffuser 121, i.e., to the z-axis. Thereby, the air discharged from the diagonal flow fan 123 is first guided by the rear portion 424 along the lateral surface of the blade plate 421d and is then guided by the front portion 422 toward the front of the diffuser 123 to form a front air stream.

The grille 121c is formed in an annular shape. Thereby, when the discharged air from the diagonal flow fan 123 is discharged through the discharge outlet 121a in the front direction of the front panel 112, the grille 121c serves to prevent the discharged air stream from being diffused upward, downward leftward and rightward and guide the discharged air.

In addition, the flow direction and flow rate of the air discharged through the discharge outlet 121a may be adjusted by widening or narrowing the radial width of the discharge outlet 121a through adjustment of the distance between the circular disc plate 121b and the grille 121c, or by adjusting the diameter of the circular disc plate 121b.

Figure 18:
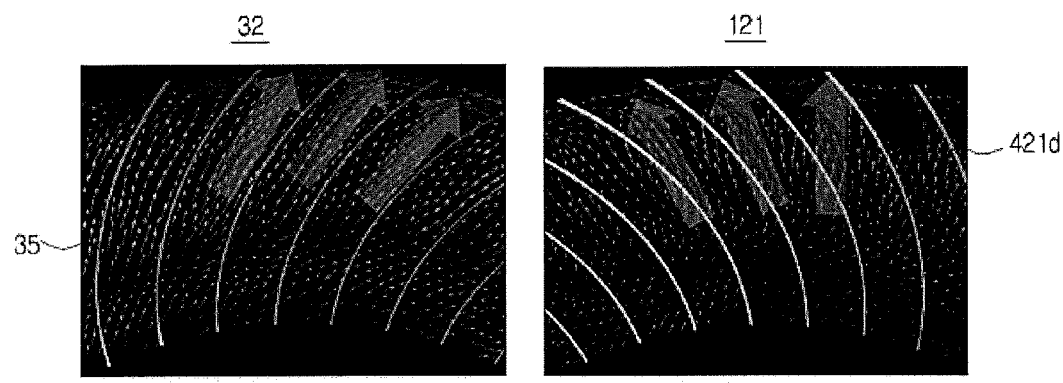
FIG. 18 to FIG. 20 are views illustrating flows of discharged air generated by a diffuser of an indoor unit of an air conditioner according to the conventional art and a diffuser of an indoor unit of an air conditioner according to another embodiment of the present disclosure.
Figure 19:
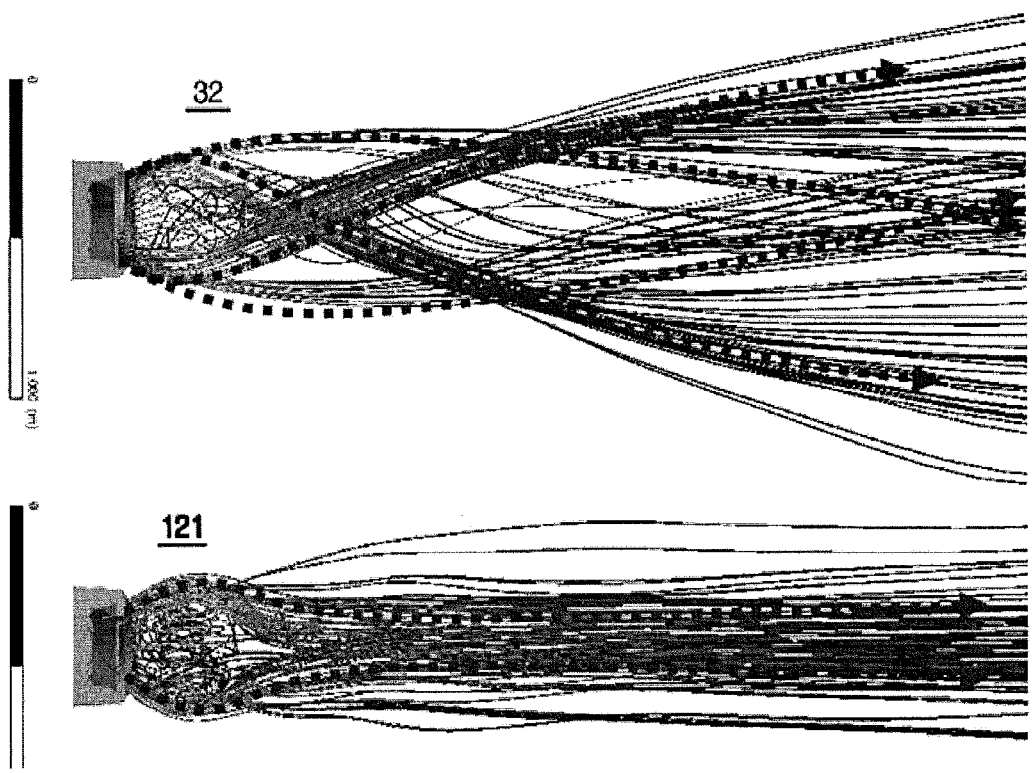
Figure 20:
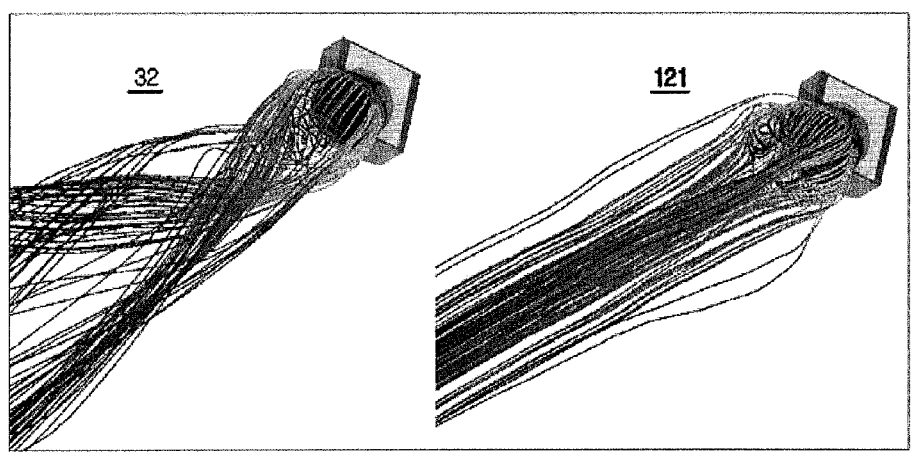

FIG. 18 to FIG. 20 are views illustrating flows of discharged air generated by a diffuser of an indoor unit of an air conditioner according to the conventional art and a diffuser of an indoor unit of an air conditioner according to another embodiment of the present disclosure.

As shown in FIGS. 18 to 20, when the direction of rotation of the diagonal flow fan 123 is the same as the direction in which the blade plate 35 is curved as in the case of the diffuser 32 according to the conventional art, air is discharged upward, downward, leftward and rightward as the diagonal flow fan 123 rotates, and as a result, the air stream is discharged to diffuse. In contrast, in case of the diffuser 121 according to the illustrated embodiment of the present disclosure, the direction of rotation of the diagonal flow fan 123 is opposite to the direction in which the blade plate 421d is curved, and therefore the discharged air from the diagonal flow fan 123 is prevented from being diffused by the blade plate 421d, but is directed in the forward direction as it is guided from the rear portion 424 to the front portion 422 of the blade plate 421d.

In addition, in case of the conventional diffuser 32, orientation of the blade plate 35 in the direction of rotation of the diagonal flow fan 123 further develops diffuse air stream in the discharged air, causing the discharged air to diffuse in all directions from the front of the air conditioner. In case of the diffuser 121 according to the illustrated embodiment of the present disclosure, on the other hand, the blade plate 421d curved in the direction opposite to the direction of rotation of the diagonal flow fan 123 develops a front air stream more than a diffuse air stream, thereby allowing the front air stream to be transferred a great distance from the front of the air conditioner.

Other constituents and operational mechanisms are the same as those of the indoor unit 100 of an air conditioner according to the previous embodiment and thus a detailed description thereof will be omitted.

As is apparent from the above description, an indoor unit of an air conditioner according to the preset disclosure has a suction inlet, a heat exchanger, a diagonal flow fan and a discharge outlet arranged in a row or a horizontal direction and thus simplifies the air flow passage, and thereby the efficiency of the indoor unit may increase and a compact size thereof may be realized.

In addition, multiple diagonal flow fans are independently controllable to facilitate adjustment of the flow direction and flow rate of air, and therefore convenience in using the indoor unit may be enhanced.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An indoor unit of an air conditioner comprising:
a housing provided with a circular opening at a front side thereof;
a circular plate disposed to cover a central portion of the circular opening;
a ring-shaped discharge outlet comprising a circumferential portion of the circular opening that surrounds the circular plate;
a drive motor coupled to a rear side of the circular plate;
a fan disposed at a rear side of the drive motor coupled to be driven by the drive motor, the fan configured to rotate to discharge air toward the ring-shaped discharge outlet;
a first guide unit arranged at a rear side of the circular plate and configured to guide air to the ring-shaped discharge outlet such that air is discharged through the ring-shaped discharge outlet;
a second guide unit disposed inside the housing and extending to the circular opening to guide air to the ring-shaped discharge outlet;
at least one suction inlet formed at a rear side of the housing; and
at least one heat exchanger disposed in the housing,
wherein the first guide unit is provided with a shape of a cylinder having one end thereof closed, a diameter of the cylinder decreasing as the cylinder extends inward from the circular plate,
the second guide unit is provided with a shape of a circular duct, a diameter of the circular duct decreasing as the circular duct extends inward from the circular plate,
a flow passage is defined between the first guide unit and the second guide unit, and air discharged forward through the flow passage diverges in a plurality of directions from the ring-shaped discharge outlet,
the second guide unit is extended closer to the circular opening further than the first guide unit,
a decreasing rate of a diameter of a front portion of the cylinder of the first guide unit is larger than a decreasing rate of a diameter of a central portion of the circular duct of the second guide unit,
the first guide unit is rotatably coupled to a rotating shaft of the drive motor, and
the fan comprises a plurality of blades coupled to the first guide unit and the outer circumferential surface of the first guide unit.

2. The indoor unit according to claim 1, wherein a diameter of the circular plate decreases in an axial direction of the circular plate.

3. The indoor unit according to claim 1, wherein an entire outer circumferential guide surface of the cylinder of the first guide unit forms an inclination angle with respect to a central axis of the cylinder of the first guide unit passing through a center of the circular plate,
wherein the inclination angle is about 10° or above and 40° or below.

4. The indoor unit according to claim 1, wherein an entire inner circumferential guide surface of the circular duct of the second guide unit forms an inclination angle with respect to a central axis of the cylinder of the first guide unit passing through a center of the circular plate,
wherein the inclination angle is about 5° or above and about 15° or below.

5. The indoor unit according to claim 1, wherein an imaginary extended line of the outer circumferential surface of the cylinder of the first guide unit meets an edge portion of the circular plate.

6. The indoor unit according to claim 1, wherein the flow passage is inclined with respect to a central axis of the cylinder of the first guide unit passing through a center of the circular plate.

7. The indoor unit according to claim 1, wherein a width of the flow passage decreases as the flow passage extends toward the ring-shaped discharge outlet.

8. The indoor unit according to claim 1, wherein an outer diameter and an inner diameter of the flow passage increase as the flow passage extend toward the discharge outlet such that air discharged from the discharge outlet through the flow passage diverges in a plurality of directions.

9. The indoor unit according to claim 8, wherein an increasing rate of the inner diameter of the flow passage is larger than an increasing rate of the outer diameter of the flow passage.

10. The indoor unit according to claim 1, wherein a distance between the shape of the cylinder of the first guide unit and the circular duct of the second guide unit increases as the first guide unit and the second guide unit extend inward from the circular plate.

11. The indoor unit according to claim 1, wherein the housing comprises at least another circular opening, and
the indoor unit further comprises a controller to independently control at least two flow fan units to drive air toward the circular openings.

12. The indoor unit according to claim 11, wherein the controller independently controls the at least two flow fan units by turning on/off at least one of the at least two flow fan units and/or by controlling a speed of rotation of at least one of the at least two flow fan units.

13. The indoor unit according to claim 1, further comprising a fixing frame disposed in the housing to support the at least one heat exchanger and the second guide unit.

* * * * *